(12) United States Patent
Sueshige et al.

(10) Patent No.: US 6,354,414 B1
(45) Date of Patent: Mar. 12, 2002

(54) CLUTCH MECHANISM

(75) Inventors: Hiroshi Sueshige; Kazuyoshi Miyahara, both of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/595,158

(22) Filed: Jun. 15, 2000

(30) Foreign Application Priority Data

Jun. 16, 1999 (JP) .......................................... 11-169736

(51) Int. Cl.$^7$ .............................................. F16D 43/00
(52) U.S. Cl. ........................................ 192/45; 192/35
(58) Field of Search .......................... 192/45, 35, 41 R

(56) References Cited

U.S. PATENT DOCUMENTS 3,895,701 A * 7/1975 Albertson et al. ............. 192/44
4,909,365 A   3/1990 Tillotson et al. ............. 192/35
4,949,824 A * 8/1990 Buckley et al. .............. 192/45

\* cited by examiner

Primary Examiner—Richard M. Lorence
Assistant Examiner—Saúl Rodríguez
(74) Attorney, Agent, or Firm—Adams & Wilks

(57) ABSTRACT

In a clutch mechanism, a disc-shaped friction plate is disposed in a housing and an oil seal is interposed between an inner circumferential surface of the housing and the outer circumferential surface of the friction plate. The oil seal applies an inward radial force to the friction plate which, when the friction plate starts to rotate, gives rise to a circumferential frictional force tending to prevent the friction plate and a plurality of clutch pins fitted in pin-holding grooves formed in an inner circumferential surface of the friction plate from moving. Consequently, a stable frictional force is obtained between the housing side and the friction plate. Because the force providing the friction acts in the radial direction of the friction plate, no spring for providing an axial thrust is required and the length direction dimension of the driving member can be made small and the clutch mechanism can be made compact.

4 Claims, 24 Drawing Sheets

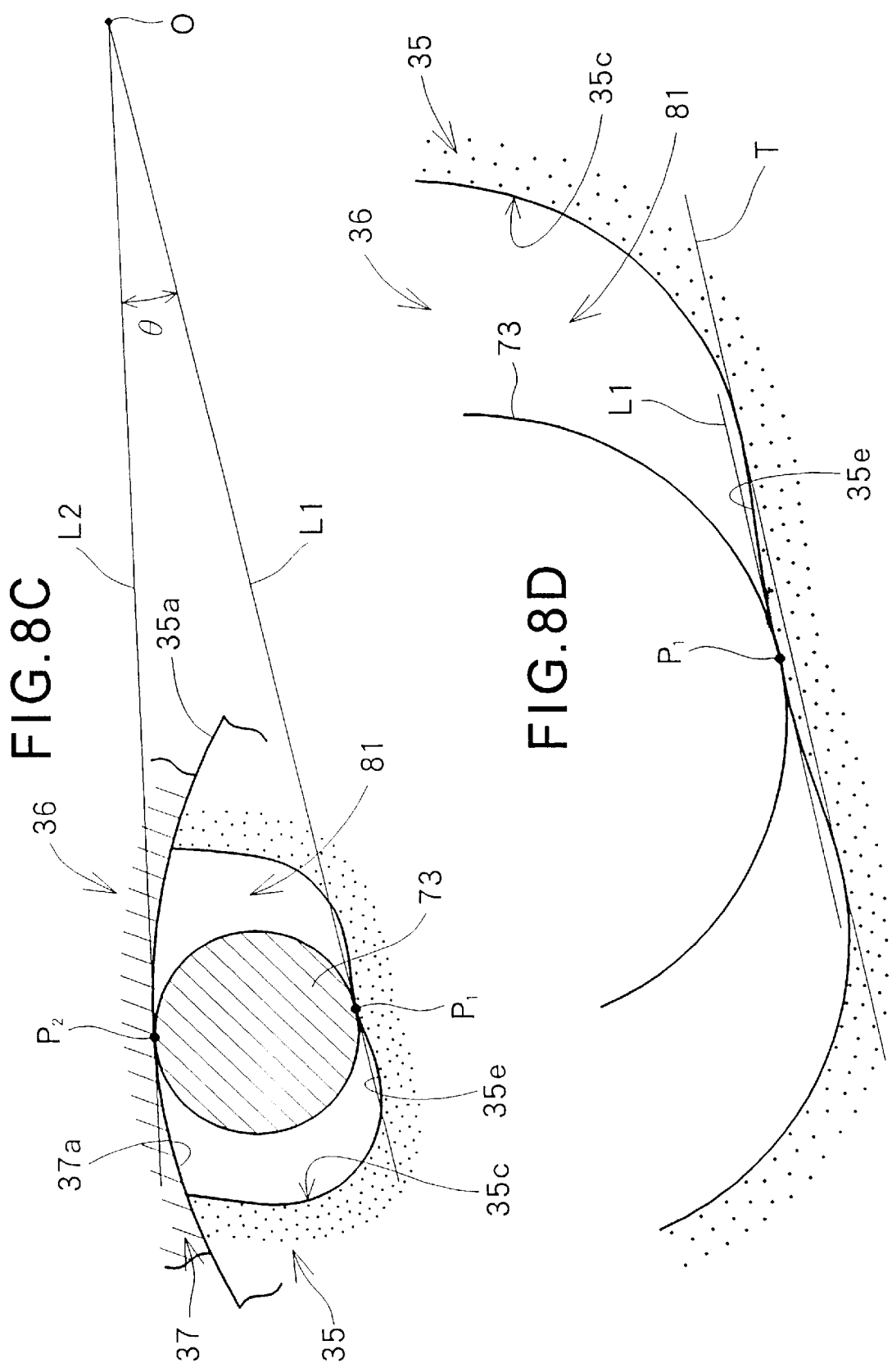

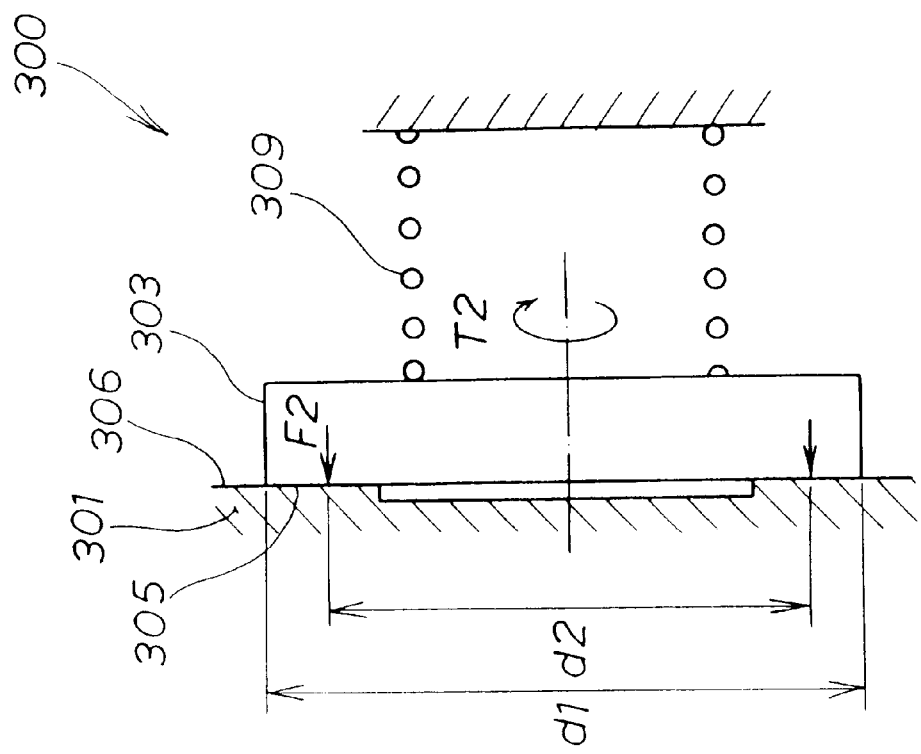
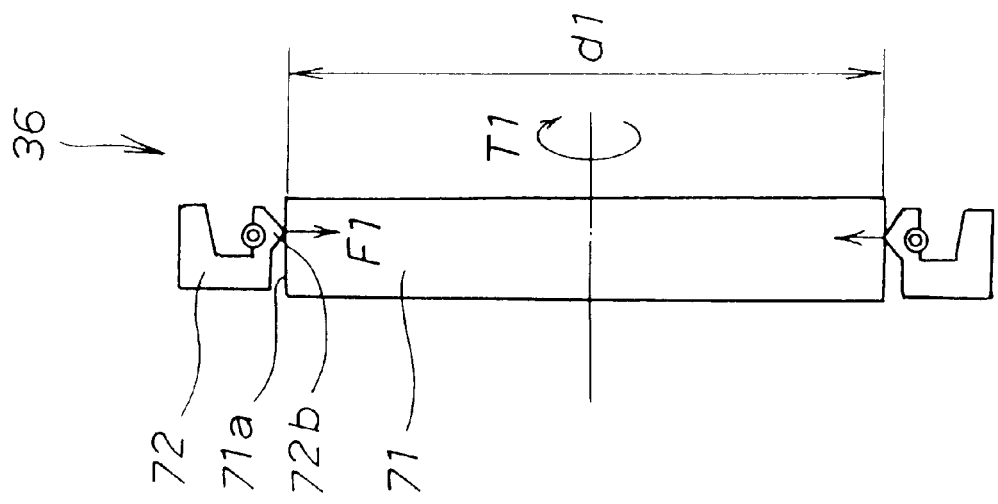
FIG. 9A
FIG. 9B

CLUTCH MECHANISM

BACKGROUND OF THE INVENTION

1. Field of the Invention

This invention relates to a clutch mechanism and, more particularly to a friction clutch mechanism wherein a driving member is coupled to a driven member using clutch pins and the clutch is switched on and off utilizing a frictional force of a friction plate.

2. Description of the Related Art

A clutch mechanism is a mechanical device for selectively connecting a driving member and a driven member, and various types, such as a friction clutch type, are used. Among these, there are those wherein when the driving member is rotated, the driving and driven members are coupled so that power can be transmitted from the driving member to the driven member, and when the driving member is stopped, the driving and driven members are uncoupled so that the driven member can rotate in both directions. This kind of clutch mechanism includes for example the "Free Wheel Clutch and Apparatus Using Same" disclosed in U.S. Pat. No. 4,909,365. The main features of this clutch mechanism are illustrated in FIG. 23 hereof.

The related art clutch mechanism 300 shown in FIG. 23 has an output shaft 302, which is a driving member, rotatably supported by a housing 301. The output shaft 302 projects outward from the housing 301. A friction plate 303 and a pinion 304, which is a driven member, are rotatably supported on the projecting part of the output shaft 302. In this clutch mechanism 300, a side face 305 of the friction plate 303 is pressed against a wall face 306 of the housing 301 with a predetermined force (thrust) F2, and the output shaft 302 and the pinion 304 are selectively coupled by the behavior of a clutch key 307 with respect to the output shaft 302 and the friction plate 303 and the pinion 304.

More specifically, in the clutch mechanism 300, a snap ring 308 is fitted to the end of the output shaft 302 projecting from the housing 301, a compression spring 309 is interposed between the snap ring 308 and the pinion 304, and by way of the pinion 304 the spring force of the compression spring 309 presses the side face 305 of the friction plate 303 against the wall face 306 of the housing 301. Also, a leg part 311 of the clutch key 307 is so fitted in the friction plate 303 that it can swing through a predetermined angle.

When the output shaft 302 rotate s, utilizing a frictional force arising between the housing 301 and the friction plate 303, the rotational timing of the friction plate 303 with respect to the output shaft 302 is delayed. As a result, the clutch key 307 swings in the front-rear direction of the drawing and couples the output shaft 302 with the pinion 304, enabling power to be transmitted between the two.

When the rotation of the output shaft 302 stops, the clutch key 307 uncouples the output shaft 302 from the pinion 304 and thereby renders the pinion n 304 rotatable in both directions.

However, this clutch mechanism of related art has had the following four problems:

Firstly, because the clutch mechanism 300 utilizes a frictional force between the housing 301 and the friction plate 303, to maintain a stable frictional force over a long period, it is necessary to consider wear of the contacting parts. In particular, when the output shaft 302 is to rotate at high speed, countermeasures to wear are even more important. And furthermore, because the contacting part of the friction plate 303 is exposed, the effect of dust and the like on its resistance to wear must be considered.

Secondly, because the clutch mechanism utilizes a frictional force obtained by pressing flat faces together, and the friction plate 303 having one of the flat faces rotates, to secure the frictional force it is necessary for the flatness and the assembly accuracy of the housing 301 and the friction plate 303 to be kept very high, and the dimensional management required is not easy.

Thirdly, because the clutch key 307, which has a complex shape, is swingably fitted in respective key grooves of the output shaft 302, the friction plate 303 and the pinion 304 to effect the clutch-ON operation, the structure of the clutch mechanism 300 is complex. Furthermore, the dimensional management of the key grooves and the clutch key 307 is not easy. Consequently, it is necessary for ample care to be taken always to engage the clutch mechanism 300 smoothly.

Fourthly, because the frictional force is produced by means of the spring force of a compression spring 309 fitted on the output shaft 302, the clutch mechanism 300 is large in the length direction of the output shaft 302.

SUMMARY OF THE INVENTION

It is therefore a first object of the present invention to provide a clutch mechanism wherein the frictional force between the housing side and the friction plate is stable.

It is a second o object of the invention to provide a clutch mechanism which is small and simple in construction, the dimensional management of which is easy, and which can always be engaged smoothly.

To achieve these and other objects, a first aspect of the invention provides a clutch mechanism comprising: a housing; a driving member, rotatably support ed by the housing a and having a plurality of cam grooves formed in an outer circumferential face thereof and extending in an axial direction thereof; a driven member, which can rotate coupled to the driving member and rotate freely uncoupled from the driving member; a disc-shaped friction plate, rotatably supported by the driving member and having in an inner circumferential face thereof a plurality of pin-holding grooves, facing the cam grooves and having their depths in a radial direction of the friction plate; tapered space parts, each formed by frictional engagement faces consisting of a bottom face of a respective cam groove and an inner circumferential face of the driven member; a plurality of clutch pins, each disposed partly in a tapered space part and partly between the cam groove forming that tapered space part and the pin-holding groove facing that cam groove; and an oil seal, interposed between an inner circumferential surface of the housing and an outer circumferential surface of the friction plate, for providing an action force tending to prevent the friction plate and, by extension, the clutch pins from moving; and a lubricant, filling a space enclosed by the housing, the friction plate and the oil seal, wherein when the driving member rotates, utilizing a frictional force on the friction plate, the clutch pins are engaged with the frictional engagement faces of the tapered space parts by a wedge action and the driving member and the driven member are thereby coupled so that power can be transmitted between them, and when the driving member stops, the driving member and the driven member cease to be coupled by the clutch pins and the driven member assumes an idling state with respect to the driving member.

Thus, in this invention, a friction plate is disposed in a housing, an oil seal is interposed between an inner circumferential surface of the housing and the outer circumferential surface of the friction plate, and the oil seal provides and action force tending to prevent the clutch pins from moving. That is, to produce a frictional force between the housing side and the friction plate, instead of a thrust force being made to act on the friction plate as in the related art, a radial force is applied. And because the frictional force is produced by an oil seal being fitted in contact with the outer circumferential surface of the friction plate and made to apply a contact force to the friction plate, the radius at which the frictional force acts can be made large. Accordingly, since a smaller frictional force is sufficient to provide the same frictional torque as in the related art described above, the contact pressure can be lowered and wear can be suppressed. As a result, the frictional force can be kept stable at all times. Furthermore, since the force providing the frictional torque acts in the radial direction, the length direction dimension of the driving member can be made small and the clutch mechanism can be made compact. Also, because a lip of the oil seal makes contact with the outer circumferential surface of the friction plate, there is no need for a high assembly accuracy and the dimensional management of the components becomes easy.

Also, a space enclosed by the housing, the friction plate and the oil seal is filled with a lubricant, and wear of the contacting parts is further suppressed by the part of the outer circumferential surface of the friction plate with which the lip of the oil seal makes contact being lubricated by the lubricant. As a result, the frictional force between the mating parts is stable. And therefore, even if the driving member rotates at a high speed during use, the clutch mechanism operates reliably. Because of this, the clutch mechanism can be used in a stable state over a wide speed range from low speeds to high speeds. Also, because the friction plate is disposed in the housing, where the installation environment is good, wear of the clutch mechanism caused by dust and the like from outside is prevented and the durability of the clutch mechanism can be increased.

Also, the pin-holding grooves are formed in the friction plate, whose rotation timing is delayed with respect to the driving member, and the clutch pins are held with these pinholding grooves. Consequently, even when with the friction plate stopped the driving member starts to rotate, the clutch pins do not immediately rotate with the driving member. As a result, the clutch pins are locked by a wedge action between the frictional engagement faces of the tapered space parts, the driving and driven members are coupled and the clutch is thereby switched ON. Because it works just by clutch pins of a simple shape being coupled with or uncoupled from the cam grooves in the driving member, the inner circumferential surface of the driven member and the pin-holding grooves of the friction plate, the clutch mechanism has a simple construction and can always be engaged smoothly. Furthermore, because the simple clutch pins are not sprung as in the related art described above but simply couple, uncouple or hold by way of the cam grooves and the pin-holding grooves, the groove shapes are also simple, dimensional management is easy, and manufacturability is good. And grooves for coupling with the clutch pins are not needed in the driven member.

If the bottom face of each of the cam grooves is made to have an arcuate face swelling toward the opening of the cam groove, the slope of the bottom face can be made gentle in the vicinity of the peak of the arcuate face and steeper with progress away from the peak. When this is done, the range of the half-clutch state is narrow, and the clutch mechanism can be switched rapidly without strain. And because the whole of the bottom face is a gentle arcuate face, the operation of switching between clutch-ON and clutch-OFF becomes smooth.

A second aspect of the invention provides a clutch mechanism comprising: a housing; a driven member, rotatably supported by the housing; a driving member, which can rotate coupled to the driven member and rotate freely, uncoupled f from the driving member, having a plurality of cam grooves formed in an inner circumferential face thereof and extending in an axial direction thereof; a disc-shaped friction plate, rotatably supported by the driven member and having in an inner circumferential face thereof a plurality of pin-holding grooves, facing the cam grooves and having their depths in a radial direction; tapered space parts, each formed by frictional engagement faces consisting of a bottom face of a cam groove and an outer circumferential face of the driven member; a plurality of clutch pins, each disposed partly in a tapered space part and partly between the cam groove forming that tapered space part and the pin-holding groove facing that cam groove; an oil seal, interposed between an inner circumferential surface of the housing and an outer circumferential surface of the friction plate, for providing an action force tending to prevent the clutch pins from moving; and a lubricant, filling a space enclosed by the housing, the friction plate and the oil seal, wherein when the driving member rotates, utilizing a frictional force on the friction plate, the clutch pins are engaged with the frictional engagement faces of the tapered space parts by a wedge action and the driving member and the driven member are coupled so that power can be transmitted from the driving member to the driven member, and when the driving member stops, the driving member and the driven member cease to be coupled by the clutch pins and the driven member assumes an idling state with respect to the driving member.

BRIEF DESCRIPTION OF THE DRAWINGS

Certain preferred embodiments of the present invention will be described in more detail below, by way of example only, with reference to the accompanying drawings, in which:

FIGS. 9A and 9B are schematic views respectively illustrating a clutch mechanism according to the invention and a clutch mechanism of related art;

DETAILED DESCRIPTION OF THE PREFERRED EMBODIMENTS

First, as a first preferred embodiment, an example wherein an electric power-assisted mono-wheeled barrow is provided with a clutch mechanism according to the invention will be described on the basis of FIGS. 1 through 11.

Figure 1:
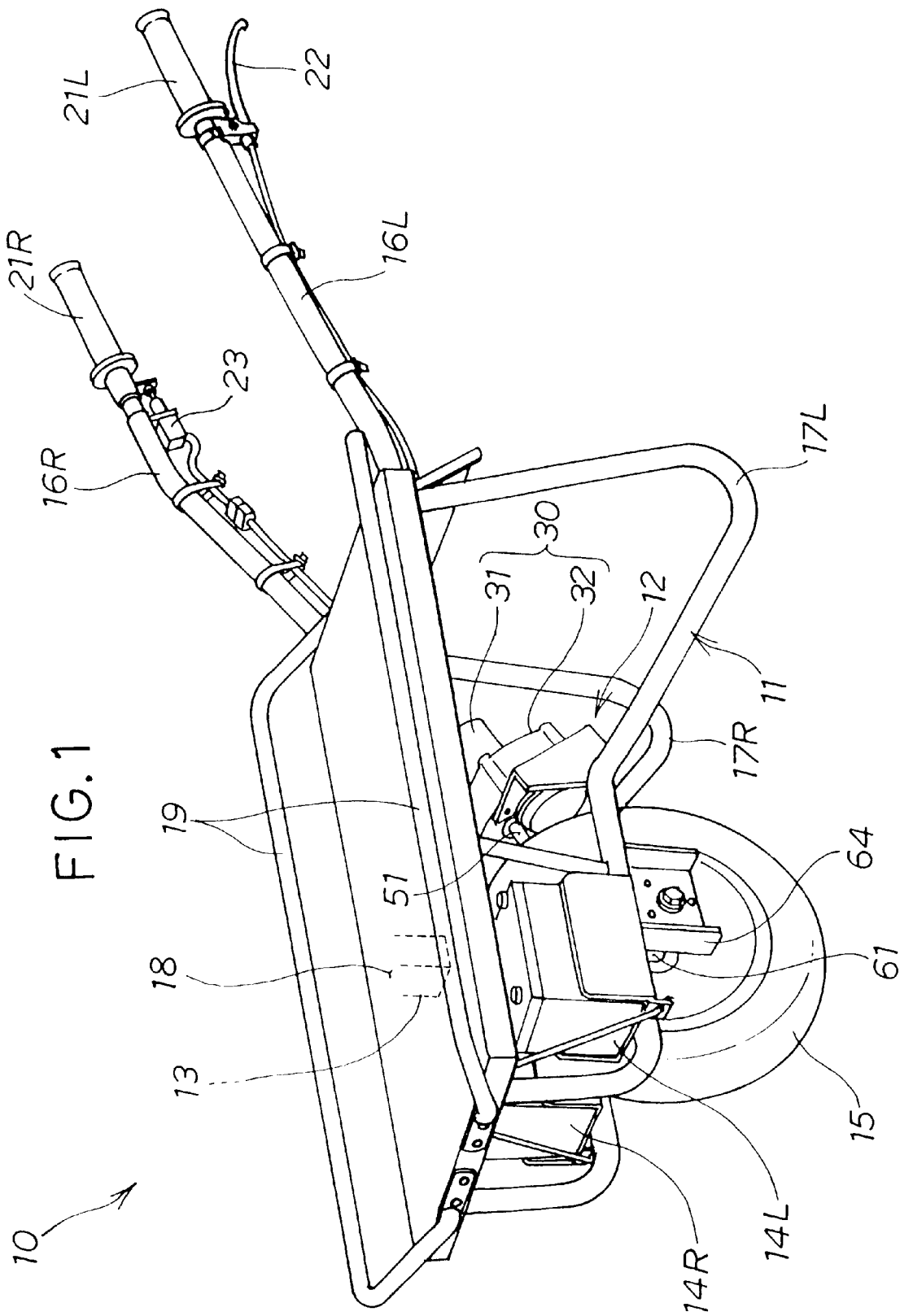
FIG. 1 is a side view of an electric power-assisted mono-wheeled barrow having a clutch mechanism according to a first preferred embodiment of the invention.

Referring to FIG. 1, an electric power-assisted mono-wheeled barrow 10 has on a body frame 11 an electric drive mechanism 12, a control unit 13, and left and right batteries 14L, 14R. A single wheel 15 is provided centrally in the width direction of the body frame 11. Left and right handles 16L, 16R extend rearward and upward from the body frame 11. Left and right ground stands 17L, 17R are provided under the rear part of the body frame 11. A load-carrying platform 18 and load-holding bars 19, 19 are provided on the top of the body frame 11. This electric power-assisted mono-wheeled barrow 10 is a single wheel barrow, of a type to be pushed by hand by a walking user, which generates an assisting power with a motor 31 of the electric drive mechanism 12 in correspondence with an operating force applied by the user and supplements the effort of the user with this assisting power.

The left operating handle 16L has at its rear end a left grip 21L and a brake lever 22. The right operating handle 16R has at its rear end a right grip 21R and a displacement detecting part 23. The right grip 21R is a sliding grip whose displacement varies in correspondence with a force pushing it toward the body frame 11.

The displacement detecting part 23 is a sensor, for example a reciprocating potentiometer, for detecting the displacement of the right grip 21R toward the body frame 11 and generating a corresponding detection signal.

The control unit 13 controls the motor 31 to generate a forward assisting power in correspondence with the detection signal from the displacement detecting part 23.

Figure 2:
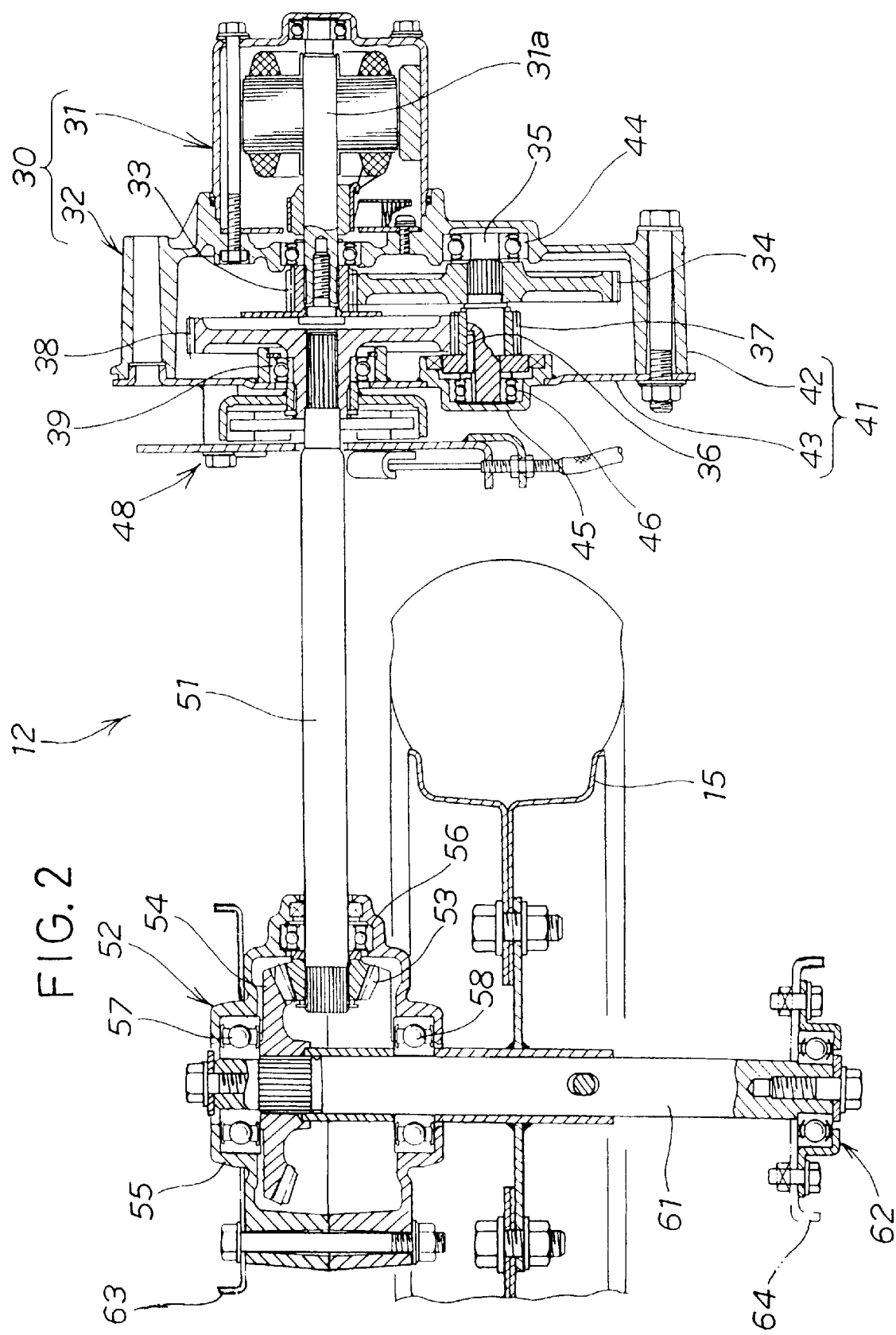
FIG. 2 is a sectional view showing details of a drive mechanism shown in FIG. 1.

In FIG. 2, the electric drive mechanism 12 transmits power from the motor 31 through an axle 61 to the wheel 15, which is a driving wheel. More specifically, the electric drive mechanism 12 has a motor with reduction gears 30 made up of the motor 31 and a first speed-reducing mechanism 32 integrally assembled thereto; a transmission shaft 51 having one end connected to the motor with reduction gears 30; a second speed-reducing mechanism 52 connected to the other end of the transmission shaft 51; the axle 61, which is connected to the second speed-reducing mechanism 52; and a bearing part 62 supporting the axle 61.

The first speed-reducing mechanism 32 is a two-stage speed-reducer having a first small gear 33 connected to the output shaft 31a of the motor 31, a first large gear 34 meshing with the first small gear 33, an intermediate shaft 35 spline-connected to and supporting the first large gear 34, a second small gear 37 connected to the intermediate shaft 35 by a clutch mechanism 36, a second large gear 38 meshing with the second small gear 37, a bearing 39 rotatably supporting the second large gear 38, and a housing 41 housing these gears 33, 35, 37, 38, the intermediate shaft 35 and the bearing 39 and so on. The second large gear 38 is connected to the motor end of the transmission shaft 51.

The housing 41 is mounted on the body frame 11 (see FIG. 1) and has a cup-shaped housing proper 42 to which the motor 31 is mounted and a lid 43 bolted over an opening of the housing proper 42. The housing proper 42 has a first bearing 44 and a second bearing 46. The second bearing 46 is provided in a bearing box 45 welded to the lid 43. The intermediate shaft 35 is supported by the first and second bearings 44, 46. The reference numeral 48 denotes a brake mechanism.

The second speed-reducing mechanism 52 is made up of a small bevel gear 53 connected to the wheel end of the transmission shaft 51, a large bevel gear 54 meshing with the small bevel gear 53, and a housing 55 housing the small and large bevel gears 53, 54. In the figure, the reference numerals 56, 57 and 58 denote bearings and the reference numerals 63, 64 denote brackets.

Figure 3:
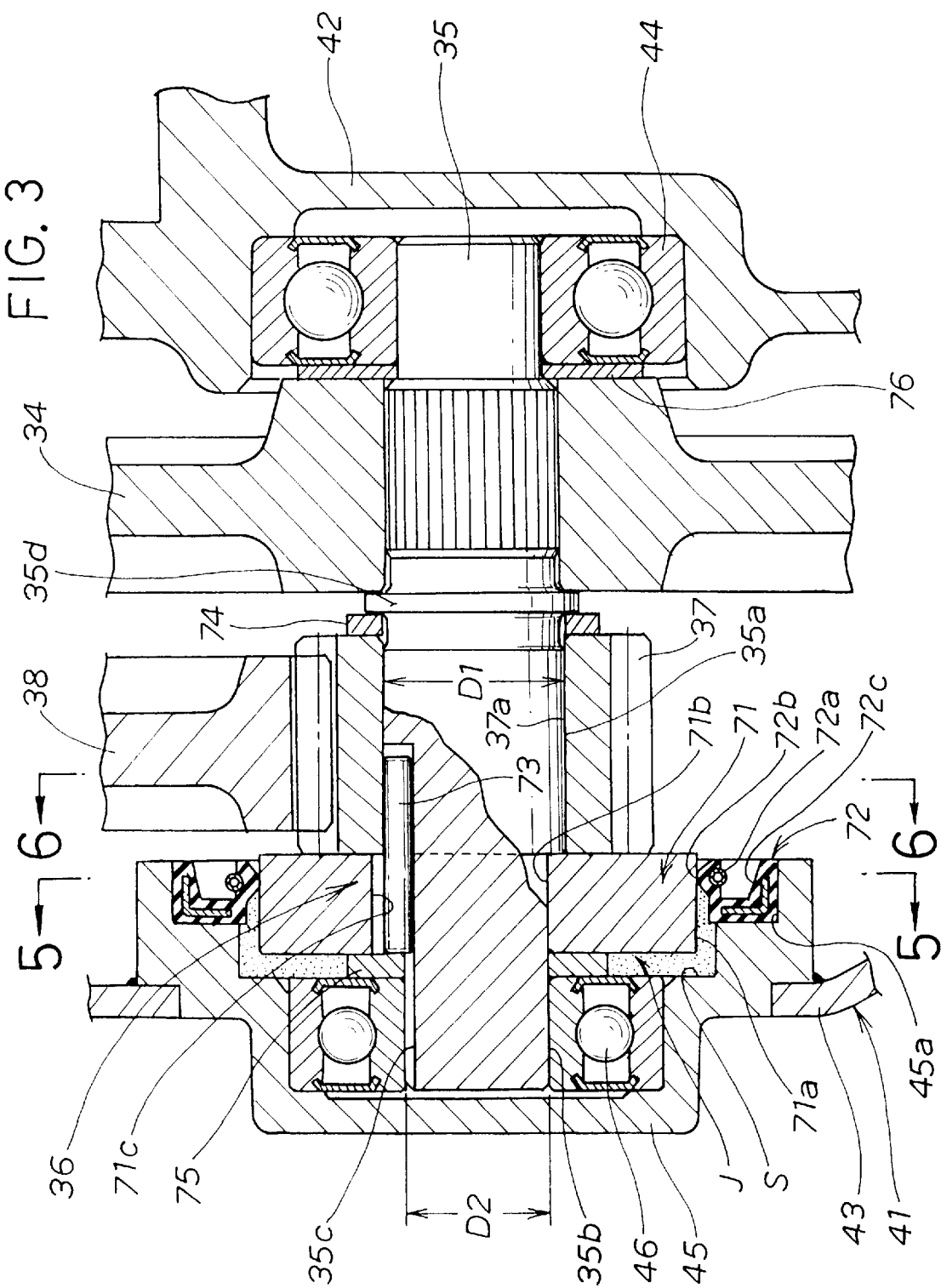
FIG. 3 is a sectional view showing details of a clutch mechanism shown in FIG. 2.

FIG. 3 is an enlarged sectional detail view of the intermediate shaft 35, the clutch mechanism 36 and the second small gear 37 shown in FIG. 2.

The clutch mechanism 36 of this preferred embodiment is a friction clutch and, only when the intermediate shaft 35, which constitutes a driving member, is rotating forward, connects the intermediate shaft 35 and the second small gear 37, which constitutes a driven member.

The clutch mechanism 36 operates in the following ways (1) and (2):

(1) When the motor 31 shown in FIG. 2 rotates forward and the intermediate shaft 35 rotates forward, the clutch mechanism 36 couples the intermediate shaft 35 and the second small gear 37 and thereby makes power transmission possible.

(2) When the motor 31 stops and the intermediate shaft 35 stops, the clutch mechanism 36 uncouples the intermediate shaft 35 from the second small gear 37 and thereby allows the second small gear 37 to rotate freely in both forward and reverse directions.

Figure 4:
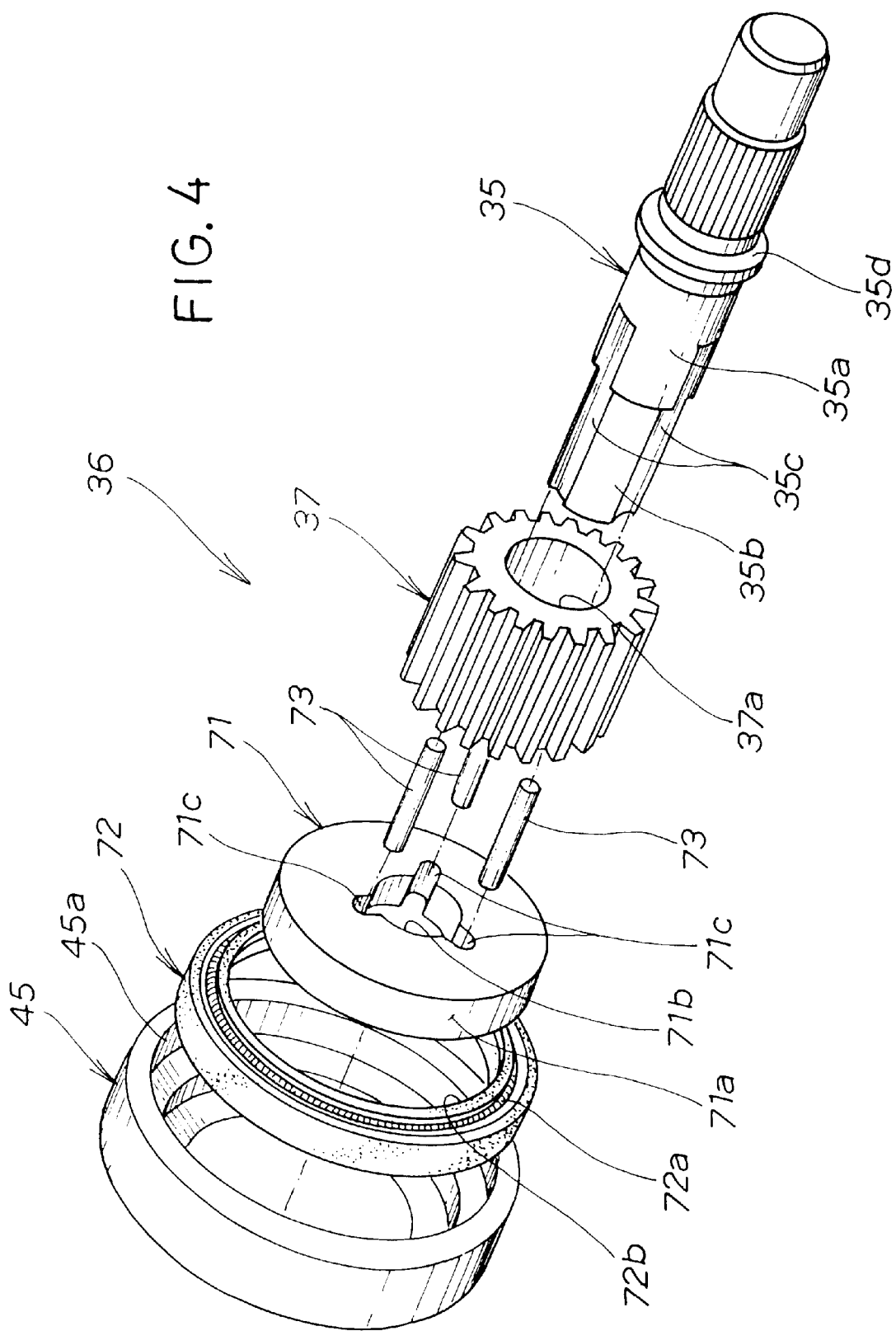
FIG. 4 is an exploded perspective view of the clutch mechanism shown in FIG. 3.

As shown in FIG. 3 and FIG. 4, as its basic construction the clutch mechanism 36 has the intermediate shaft 35; the second small gear 37 and a friction plate 71, rotatably supported by the intermediate shaft 35; an oil seal 72 for pressing radially inward on the friction plate 71 with a predetermined force; and clutch pins (bar rollers) 73 for engaging with cam grooves 35c in the intermediate shaft 35, an inner circumferential face 37a of the second small gear 37, and pin-holding grooves 71c in the friction plate 71.

The intermediate shaft 35 is so formed that the diameter D2 of the part where the friction plate 71 is fitted is smaller than the diameter D1 of the part where the second small gear 37 is fitted, as shown in FIG. 3, and has a plurality of cam grooves 35c formed in its circumferential face extending in the length direction from the circumferential face 35a at the larger diameter D1 part to the circumferential face 35b of the smaller diameter D2 part.

By means of the step formed by the larger diameter D1 and the smaller diameter D2, the intermediate shaft 35 is fitted immovably in the axial direction between the first bearing 44 and the second bearing 46. Also, the intermediate shaft 35 has between the first large gear 34 and the second small gear 37 a collar part 35d for positioning. By a first thrust ring 74, the second small gear 37, the friction plate 71 and a second thrust ring 75 being fitted on the intermediate shaft 35 in this order from the collar part 35d toward the second bearing 46, these members are mounted immovably in the axial direction between the collar part 35d and the second bearing 46. In FIG. 3, the reference numeral 76 denotes a third thrust ring provided on the first bearing 44 side.

The bearing box 45 is a cup-shaped member, and the oil seal 72 is fitted around the inner circumferential face 45a of its opening part. As the oil seal 72, for example an embedded case spring-loaded oil seal' specified in JIS B-2402 is used. This embedded case spring-loaded oil seal' is made up of a single lip 72b using a spring 72a and a metal ring 72c and has its outer circumferential face covered with rubber.

The lip 72b of the oil seal 72 forms a seal by pressing against the outer circumferential face 71a of the friction plate 71, which is a rotating part. In this way, any gap between the inner circumferential face 45a of the bearing box 45, which is a part of the housing 41, and the outer circumferential face 71a of the friction plate 71 is sealed by the oil seal 72, and the bearing box 45, that is, the space S enclosed by the housing 41 and the friction plate 71 and the oil seal 72, is filled with a lubricant J, for example grease.

The oil seal 72 so makes contact with the outer circumferential face 71a of the friction plate 71 as to give rise to an action impeding movement of the clutch pins 73. Accordingly, the friction plate 71 makes contact with the housing 41 side with a predetermined contact force by way of the oil seal 72. The frictional torque arising from the contact between the outer circumferential face 71a of the friction plate 71 and the lip 72b of the oil seal 72 is set to be larger than the sum of the frictional torques arising from the contact between the friction plate 71 and other parts (the intermediate shaft 35, the second small gear 37 and the second thrust ring 75).

Also, because as mentioned above the part with which the lip 72b of the oil seal 72 makes contact is lubricated with the lubricant J, wear of the outer circumferential face 71a of the friction plate 71 and the lip 72b can be suppressed. The size of the frictional force arising due to the contact between the outer circumferential face 71a of the friction plate 71 and the lip 72b is set partly through the lubrication.

As shown in FIG. 4 the friction plate 71 is a disc-shaped member having three pin-holding grooves 71c formed in the inner circumferential face 71b fitting on the intermediate shaft 35, having their depths in the radial direction and facing the three cam grooves 35c (only two of which are shown in the figure). The three clutch pins 73 are long-by-narrow round bars.

Figure 5:
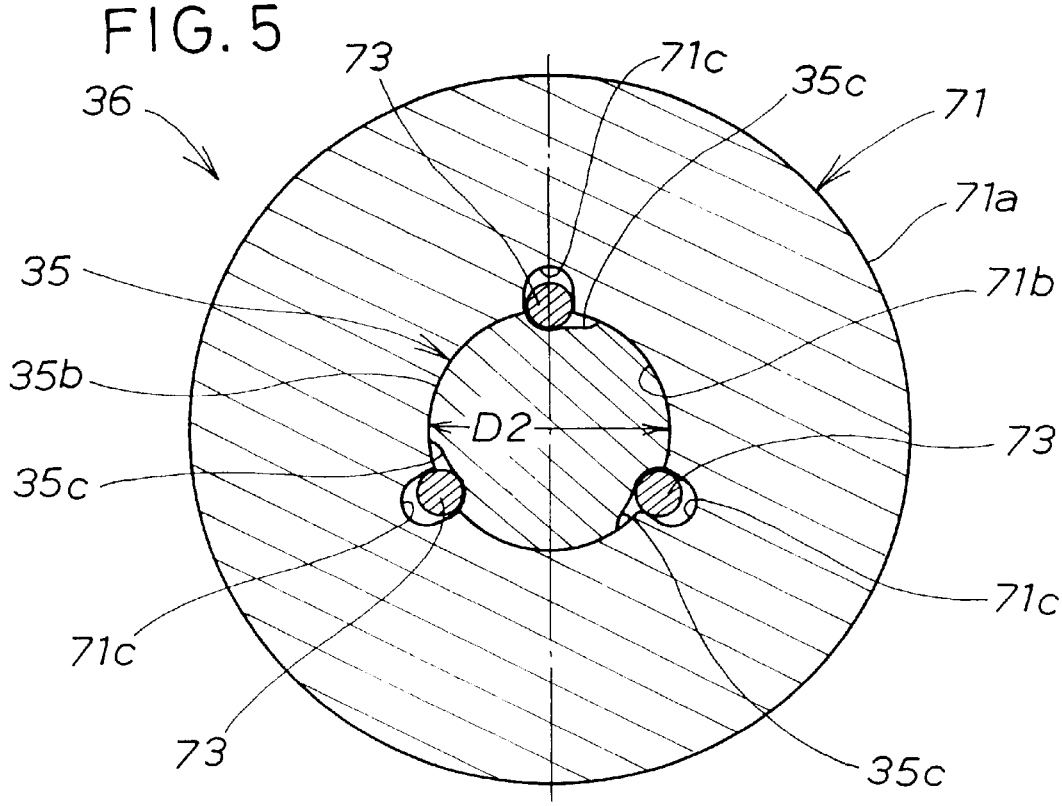
FIG. 5 is a sectional view on the line 5—5 in FIG. 3.

FIG. 5 shows the coupling relationship between the intermediate shaft 35 and the friction plate 71 and the clutch pins 73 of when the clutch mechanism 36 is OFF.

Referring to FIG. 5, the three cam grooves 35c are formed with a uniform spacing in the circumferential face 35b of the intermediate shaft 35. The pin-holding grooves 71c are formed in the inner circumferential face 71b of the friction plate 71 with their depths in the radial direction and facing the positions of the cam grooves 35c. The clutch pins 73 are interposed between the cam grooves 35c and the pin-holding grooves 71c.

Because the depth of the cam grooves 35c at the small diameter D2 part of the intermediate shaft 35 is shallow, the cam grooves 35c receive the clutch pins 73 only partially. The remaining portions of the clutch pins 73 are received in the pin-holding grooves 71c.

Figure 6:
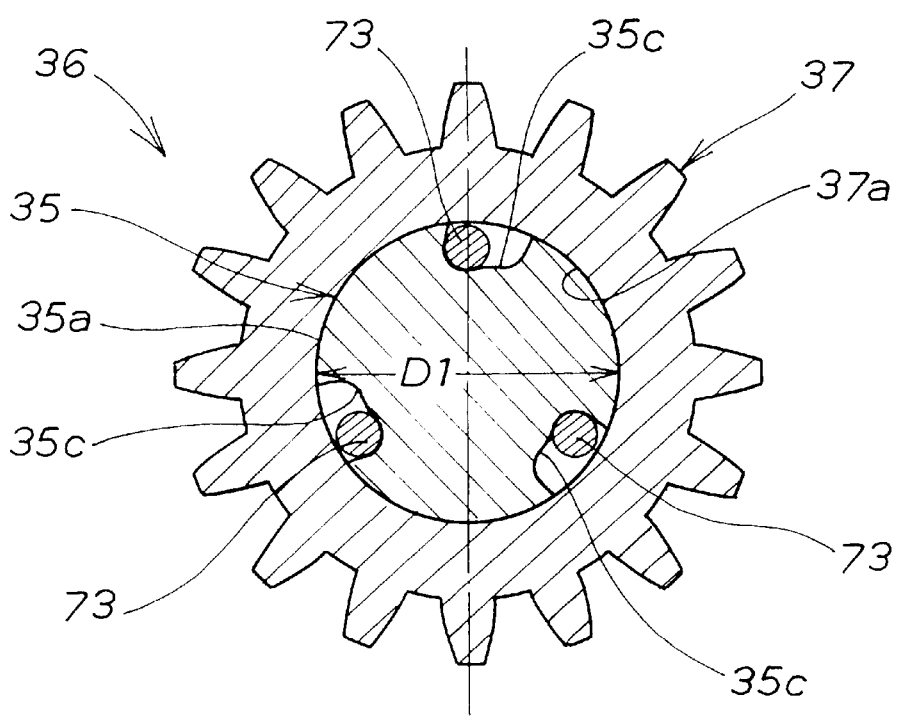
FIG. 6 is a sectional view on the line 6—6 in FIG. 3.
Figure 7:
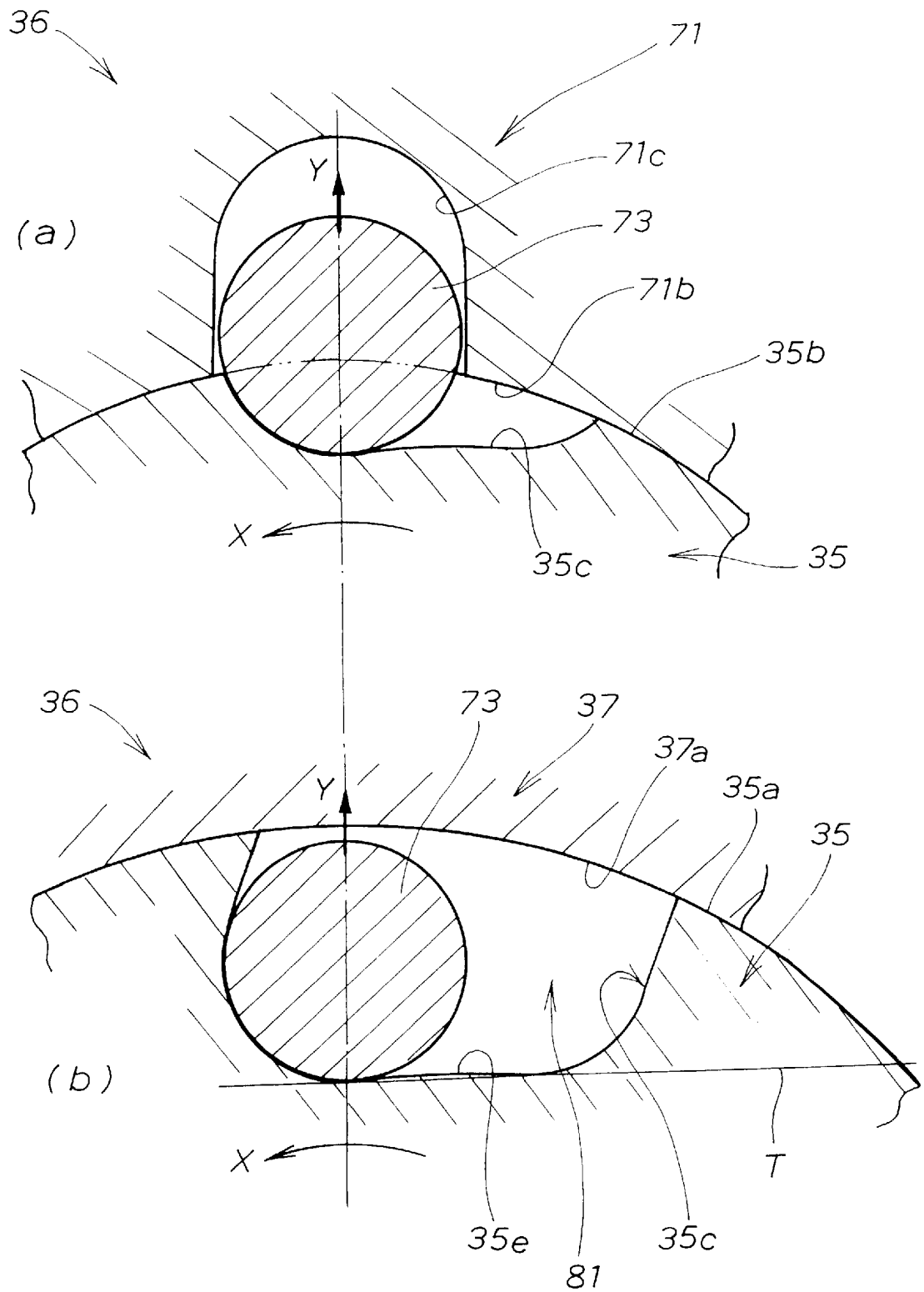
FIG. 7 is an enlarged sectional view of a part of the clutch mechanism shown in FIG. 5 and FIG. 6, and illustrates an OFF state of the clutch mechanism.

FIG. 6 shows the coupling relationship between the intermediate shaft 35 and the second small gear 37 and the clutch pins 73. The cam grooves 35c at the large diameter D1 part of the intermediate shaft 35 have a depth such that they can each receive the whole of the respective clutch pin 73.

FIGS. 7(a) and 7(b) show an enlarged detail of FIG. 5 and an enlarged detail of FIG. 6 of when the clutch mechanism is off.

In FIG. 7(a), the groove width of the pin-holding groove 71c is slightly larger than the diameter of the clutch pin 73, and the clutch pin 73 can move in the radial direction Y of the friction plate 71. The depth of the pin-holding groove 71c is set to be slightly smaller than the diameter of the clutch pin 73.

In FIG. 7(b), the groove depth of the cam groove 35c is set to gradually become smaller when the intermediate shaft 35 rotates in the forward direction shown with an arrow X. As a result, a tapered space 81 is formed by the bottom face 35e of the cam groove 35c and the inner circumferential face 37a of the second small gear 37, and the clutch pin 73 is interposed in this tapered space 81. The tapered space 81 is a tapered (wedge-shaped) space having a predetermined angle at which the extension line T of the substantially flat bottom face 35e and the arcuate inner circumferential face 37a intersect. The bottom face 35e has a gentle arcuate surface which, in a radial cross-section view, swells slightly toward the open side of the cam groove 35c (toward the inner circumferential face 37a of the second small gear 37). This arcuate face is a curved surface of for example an involute curve.

Next, the operation of the clutch mechanism 36 will be described on the basis of FIGS. 7(a) through 8B(b).

In FIGS. 7(a) and 7(b), when the clutch mechanism 36 is off, the clutch pin 73 is movable in the radial direction Y between the bottom face 35e of the cam groove 35c and the inner circumferential face 37a of the second small gear 37.

When the intermediate shaft 35 is rotated, the frictional torque arising from the contact between the friction plate 71 and the oil seal 72 (see FIG. 3) is larger than the frictional torque arising from the contact between the intermediate shaft 35 and the friction plate 71. Consequently, a force impeding movement of the friction plate 71 arises at the oil seal 72. Accordingly, when the friction plate 71 is stopped, even if the intermediate shaft 35 is rotated, the clutch pins 73 cannot immediately rotate with it. The clutch mechanism 36 utilizes the frictional force between the friction plate 71 and the oil seal 72 to retard the rotation start timing of the friction plate 71 with respect to the intermediate shaft 35.

As shown in FIG. 7(b), when the intermediate shaft 35 is rotated forward in the X-direction, the phase of the intermediate shaft 35 with respect to the second small gear 37 changes. Along with this, the bottom face 35e of the cam groove 35c moves the clutch pin 73 in the radial direction Y and presses it against the inner circumferential face 37a.

Next, the operation of this clutch mechanism will be described on the basis of FIGS. 8A(a) through 8D.

Figure 8A:
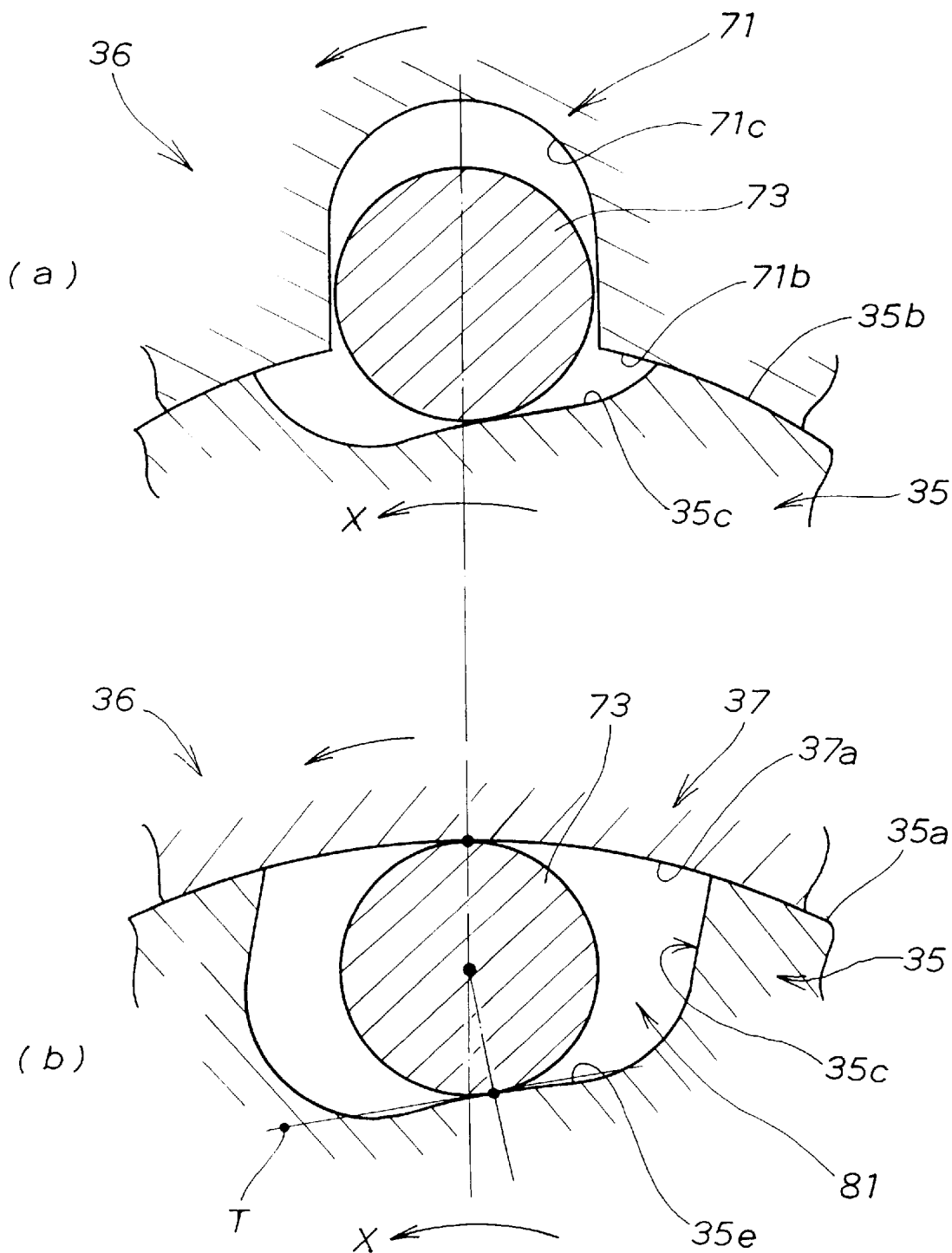
FIGS. 8A($a$) through 8D are views illustrating the operation of the clutch mechanism of the first preferred embodiment.

FIG. 8A(b) shows the clutch mechanism 36 having become ON as a result of the clutch pin 73 engaging with frictional engagement faces of the tapered space 81 in a wedge action. The intermediate shaft 35 and the second small gear 37 are thereby connected, and power transmission is possible. The frictional engagement faces of the tapered space 81 are the bottom face 35e and the inner circumferential face 37a.

When the intermediate shaft 35 rotates forward further in the arrow X direction, power from the intermediate shaft 35 is transmitted via the bottom face 35e, the clutch pin 73 and the inner circumferential face 37a to the second small gear 37. The second small gear 37 then rotates in the same arrow X direction as the intermediate shaft 35. And, slightly later than the start of rotation of the second small gear 37, the friction plate 71 also rotates in the arrow X direction.

As mentioned above, a force tending to prevent the friction plate 71 from moving arises at the oil seal 72. Consequently, when the rotation of the friction plate 71 starts, in the lip 72b (see FIG. 3), which has elasticity, an elastic force tending to push the friction plate 71 back in the reverse direction arises in the lip 72b. This elastic force further increases the wedge action of the clutch pin 73.

When from the ON-state of the clutch mechanism 36 the intermediate shaft 35 is stopped and the second small gear 37 is rotated in the arrow X direction, the clutch pin 73 is moved in the arrow X direction and the wedge action of the clutch pin 73 against the frictional engagement face s 35e, 37a of the taperedspace 81 ceases. Consequently, the coupling of the intermediate shaft 35 and the second small gear 37 effected by the clutch pin 73 ends and the clutch mechanism 36 becomes OFF. The second small gear 37 the n rotates freely.

Figure 8B:
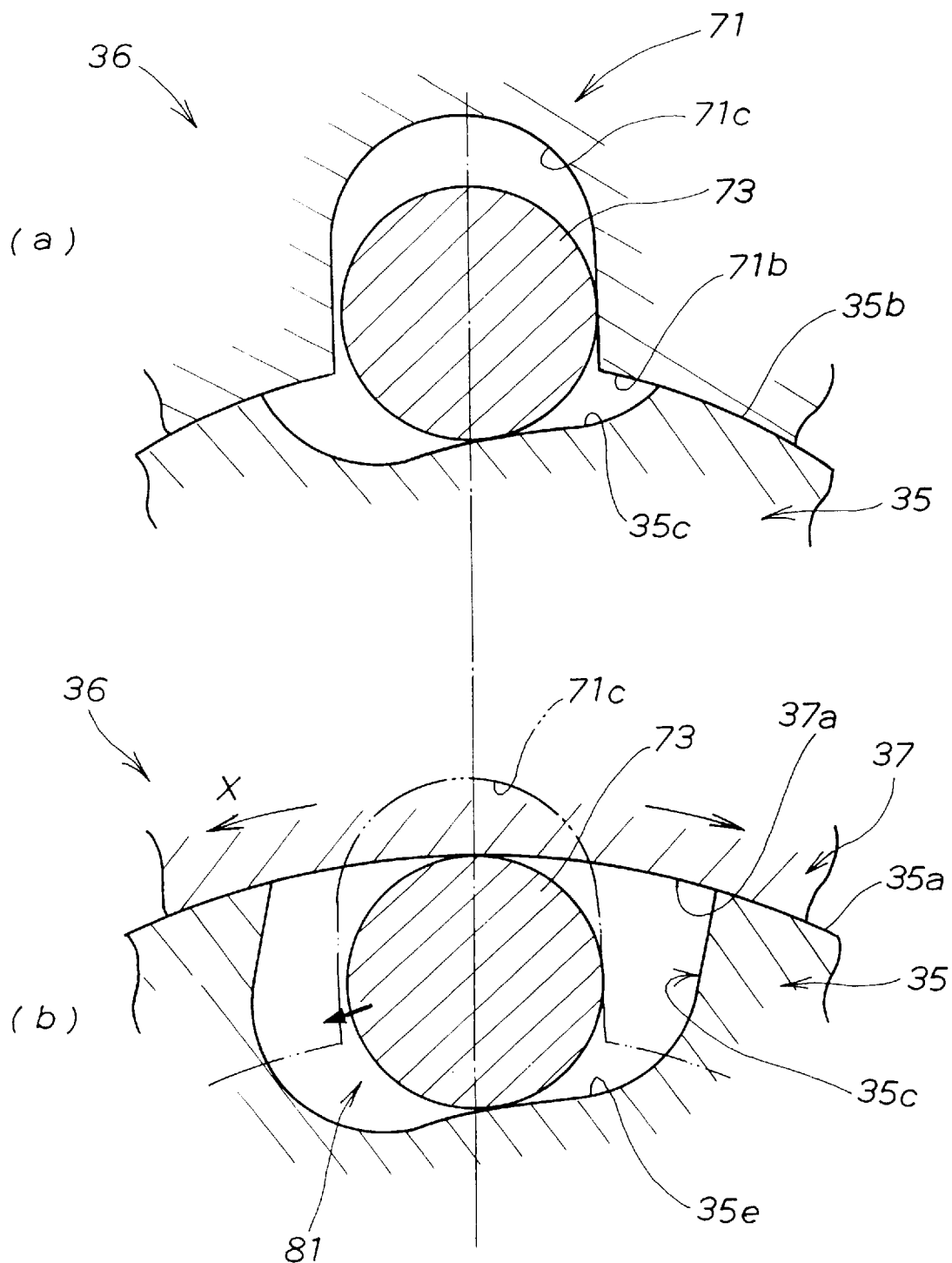

As shown in FIG. 8B(b), when from the ON-state of the clutch mechanism 36 the intermediate shaft 35 is stopped and the second small gear 37 is reverse-rotated in the opposite direction to the arrow X (when the electric power-assisted mono-wheeled barrow 10 shown in FIG. 1 is pulled backwards by a user), the clutch pin 73 also moves in the opposite direction to the arrow X, and the clutch pin 73 strikes the wall face of the pin-holding groove 71c, as shown in FIG. 8B(a). A force tending to prevent the friction plate 71 from moving arises in the oil seal 72 (see FIG. 3), and with the friction plate 71 stopped, even when the second small gear 37 is rotated, the clutch pin 73 cannot move further in that direction.

Thus, when the clutch pin 73 strikes the wall face of the pin-holding groove 71c, the wedge action of the clutch pin 73 against the frictional engagement faces 35e, 37a of the tapered space 81 ceases. Consequently, the coupling of the intermediate shaft 35 and the second small gear 37 ends and the clutch mechanism 36 becomes OFF. And the second small gear 37 then rotates freely.

In this way, in the OFF-state, the second small gear 37 can be rotated freely in both the forward direction and the reverse direction.

FIG. 8C illustrates the ON-state of the clutch mechanism 36. The cross-sectionally circular clutch pin 73 makes contact with the swelling bottom face 35e at a point $P_1$, and makes contact with the inner circumferential face 37a at a point $P_2$. If the contact line at the point $P_1$ is written $L_1$ and the contact line at the point $P_2$ is written $L_2$, then the contact line $L_1$ and the contact line $L_2$ intersect at a point O. The angle $P_1$, O, $P_2$ is θ, and this angle θ is the wedge angle (taper angle) of when the clutch pin 73 frictionally engages with the frictional engagement faces 35e, 37a of the tapered space 81 in a wedge action.

FIG. 8D shows the vicinity of the bottom face 35e enlarged. With a sloping extension line T as a bottom, the bottom face 35e is an arcuate face with a gentle curvature swelling slightly toward the opening of the cam groove 35c from this bottom, and the peak of this arcuate face is the point $P_1$. The contact line $L_1$ is parallel with the extension line T.

Now, let it be supposed that the bottom face 35e is a flat face on the contact line $L_1$. To raise the effect of the wedge action of the clutch pin 73, it is only necessary to make the slope of the contact line $L_1$ with respect to the contact line $L_2$ gentle. However, when the slope of the contact line $L_1$ is gentle, the range over which the coupling between the frictional engagement faces of the tapered space 81 and the clutch pin 73 is in an incomplete state, that is, a half-clutch state, is wider. Consequently, there is room for improvement in the speed with which the clutch mechanism 36 can be switched.

On the other hand, to enable the clutch mechanism 36 to be switched rapidly, it is only necessary to make the slope of the contact line $L_1$ with respect to the contact line $L_2$ steeper, to increase the wedge angle θ. However, this reduces the effect of the wedge action.

In contrast with this, because the bottom face 35e of the clutch mechanism 36 of this invention is a gentle arcuate face with the point $P_1$ as its peak, the slope of the vicinity of the point $P_1$ is gentle and the slope becomes steeper with progress away from the point $P_1$. Consequently, the range of the half-clutch state is narrow. When the range of the half-clutch state is narrow like this, then [1] immediately before the clutch becomes ON, the effect of the wedge action of the clutch pin 73 sharply rises; and [2] just a small reverse rotation of the intermediate shaft 35 will cause the clutch pin 73 to slip out of the clutch-ON state. Therefore, the clutch mechanism 36 can be rapidly switched without strain. Also, because the whole of the bottom face 35e is a gentle arcuate face, the operation of switching between clutch-ON and clutch-OFF is smooth.

FIGS. 9A and 9B respectively are a schematic view of a clutch mechanism according to the invention and a schematic view of a clutch mechanism of related a rt.

In FIG. 9A, because the lip 72b of the oil seal 72 exerts an elastic force radially toward the center of the friction plate 71, it makes contact with the outer circumferential face 71a of the friction plate 71 with a predetermined radial force F1. If the coefficient of friction of the outer circumferential face 71a with respect to the lip 72b is written μ1, the rotational force necessary to rotate the friction plate 71, or frictional force f1, can be expressed using the following equation (1).

$$f1 = F1 \times \mu1 \qquad (1)$$

If the external diameter of the friction plate 71 is written d1 then because the radius of the surface at which the frictional fore f1 arises, i.e. the action radius, is d1/2, the resulting frictional torque T1 can be expressed using the following equation (2):

$$T1 = f1 \times (d1/2) = F1 \times \mu1 \times (d1/2) \qquad (2)$$

Figure 23:
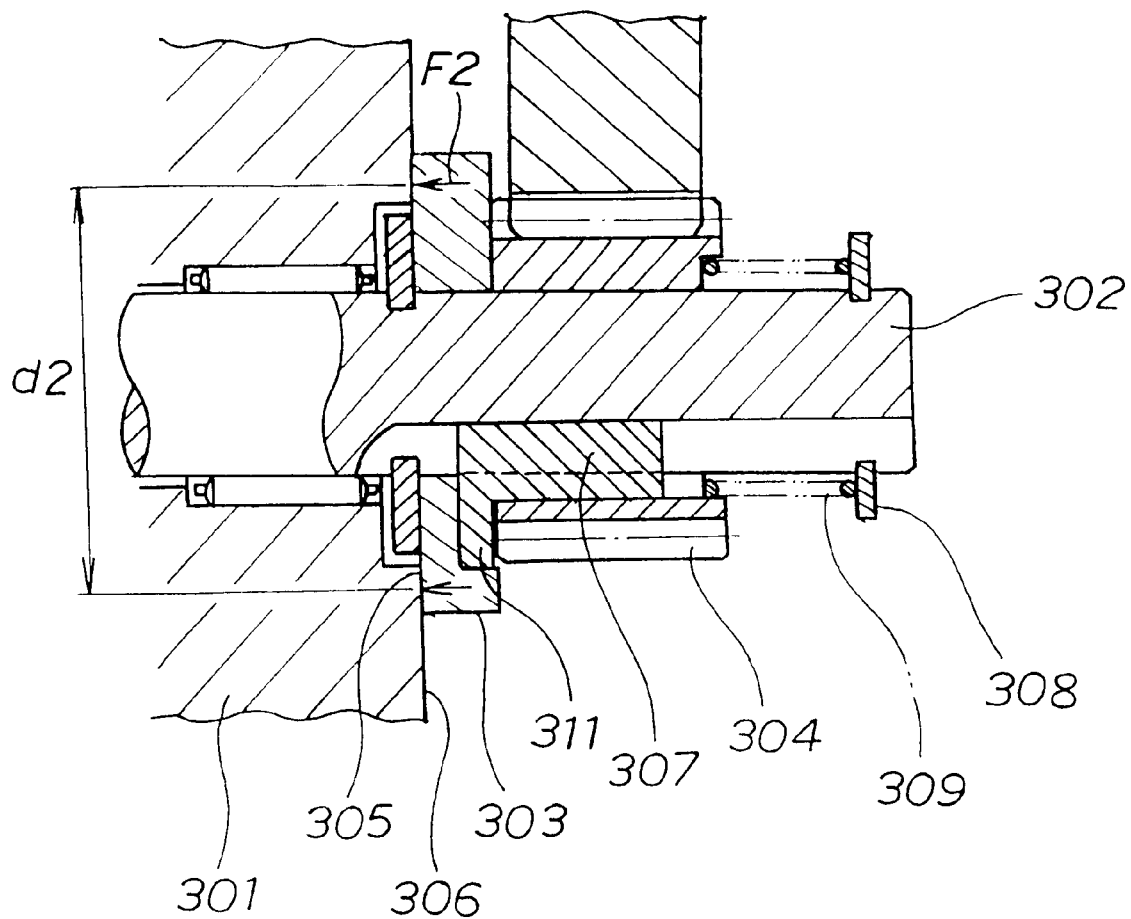
FIG. 23 is a sectional view of a clutch mechanism of related art.

FIG. 9B shows schematically the clutch mechanism 300 shown in FIG. 23 as an example of related art. The side face 305 of the friction plate 303 pressed upon by the compression spring 309 makes contact with the wall face 306 of the housing 301 with a predetermined thrust force F2. If the coefficient of friction of the side face 305 with respect to the wall face 306 is written μ2, then the rotational force necessary to rotate the friction plate 303, or the frictional force f2, can be expressed using the following equation (3).

$$f2 = F2 \times p2 \qquad (3)$$

The side face 305 is an annular contact face. The average of the internal diameter and the external diameter of this contact face will be written as the average contact radius d2 with respect to the wall face 306. Because the contact radius at which the frictional force f2 arises, i.e. the action radius, is d2/2, the frictional torque T2 can be expressed using the following equation (4).

$$T2 = f2 \times (d2/2) = F2 \times \mu 2 \times (d2/2) \qquad (4)$$

The external diameter d1 of the friction plate 71 is larger than the average contact diameter d2. Here, supposing that $\mu 1 = \mu 2$, then if T1=T2 the following expression (5) holds.

$$F1 = F2 \times (d2/d1) \qquad (5)$$

Thus, if the lip 72b of an oil seal 72 is fitted around the outer circumferential face 71a of the friction plate 71 to produce a frictional force, as shown in FIG. 9A, to obtain the same frictional torque T2 as in FIG. 9B, the small force F1 is sufficient. As a result, the contact pressure between the outer circumferential face 71a and the lip 72b is small. And if the contact pressure is small, wear is suppressed.

Next, the operation of the electric power-assisted mono-wheeled barrow 10 shown in FIG. 1 using this clutch mechanism will be explained.

When the pushing force exerted on the right grip 21R by a worker is small, the motor 31 is in a stopped state. When the motor 31 is stopped like this, because the clutch mechanism 36 (see FIG. 2) is OFF, the rotational force of the wheel 15 is not transmitted to the motor 31 and the electric power-assisted mono-wheeled barrow 10 can be propelled by human power alone. When the pushing force on the right grip 21R becomes large, in correspondence with that force, the human power is assisted by an assist power from the motor 31, and the labor is lightened.

In this way, by gripping and pushing the grips 21L and 21R, a worker can either propel the electric power-assisted mono-wheeled barrow 10 by human power alone or with assisting power from the motor. Accordingly, a special control operation for adjusting the assisting power is unnecessary, the operating feeling is good, the operability rises and the burden of operation is light.

Because this kind of electric power-assisted mono-wheeled barrow 10 is capable of small, sharp turns, it is often used for carrying loads such as farm produce along furrows of fields. Because it is not possible to turn the electric power-assisted mono-wheeled barrow 10 in a narrow furrow, the worker will pull the grips 21L and 21R and pull back the empty electric power-assisted mono-wheeled barrow 10 when entering a furrow. Although the motor 31 is stopped, because the barrow is empty, the electric power-assisted mono-wheeled barrow 10 is light.

After farm produce is loaded in a furrow, the grips 21L and 21R are pushed and the electric power-assisted mono-wheeled barrow 10 is propelled forward to the end of the furrow. Because the electric power-assisted mono-wheeled barrow 10 is now heavy, the pushing force on the grips 21L and 21R is large. However, because the human effort is supplemented by the assisting power of the motor 31, the labor is light.

FIGS. 10 through 15 show a second preferred embodiment, wherein a lawnmower is provided with a clutch mechanism according to the invention.

Figure 10:
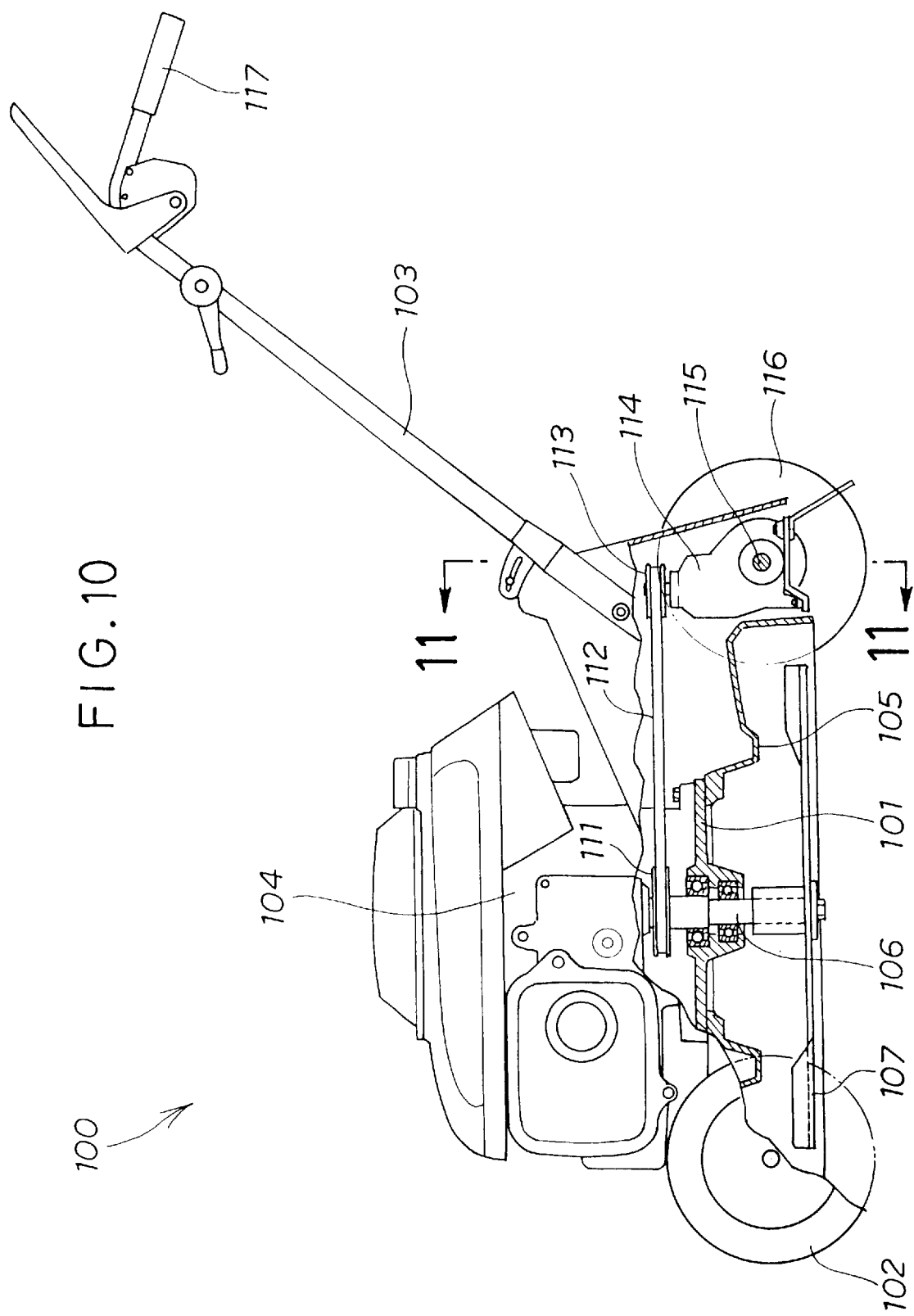
FIG. 10 is a partially sectional side view of a lawnmower having a clutch mechanism according to a second preferred embodiment of the invention.

In FIG. 10, a lawnmower 100 is a walking-type self-propelled lawnmower made up of a body frame 101, front wheels 102 mounted on the body frame 101, left and right operating handles 103, 103 (only the left one being shown in the drawing), an engine 104 mounted centrally on top of the body frame 101, a cutter housing 105 mounted centrally below the body frame 101, a cutting blade 107 attached to an output shaft 106 of the engine 104, a transmission mechanism 114 connected by transmission parts (a drive pulley 11, a belt 112, a driven pulley 113) to the output shaft 106, and left and right rear wheels 116, 116, which are driving wheels, connected to the transmission mechanism 114 by an axle 115. The reference numeral 117 denotes a grip.

Figure 11:
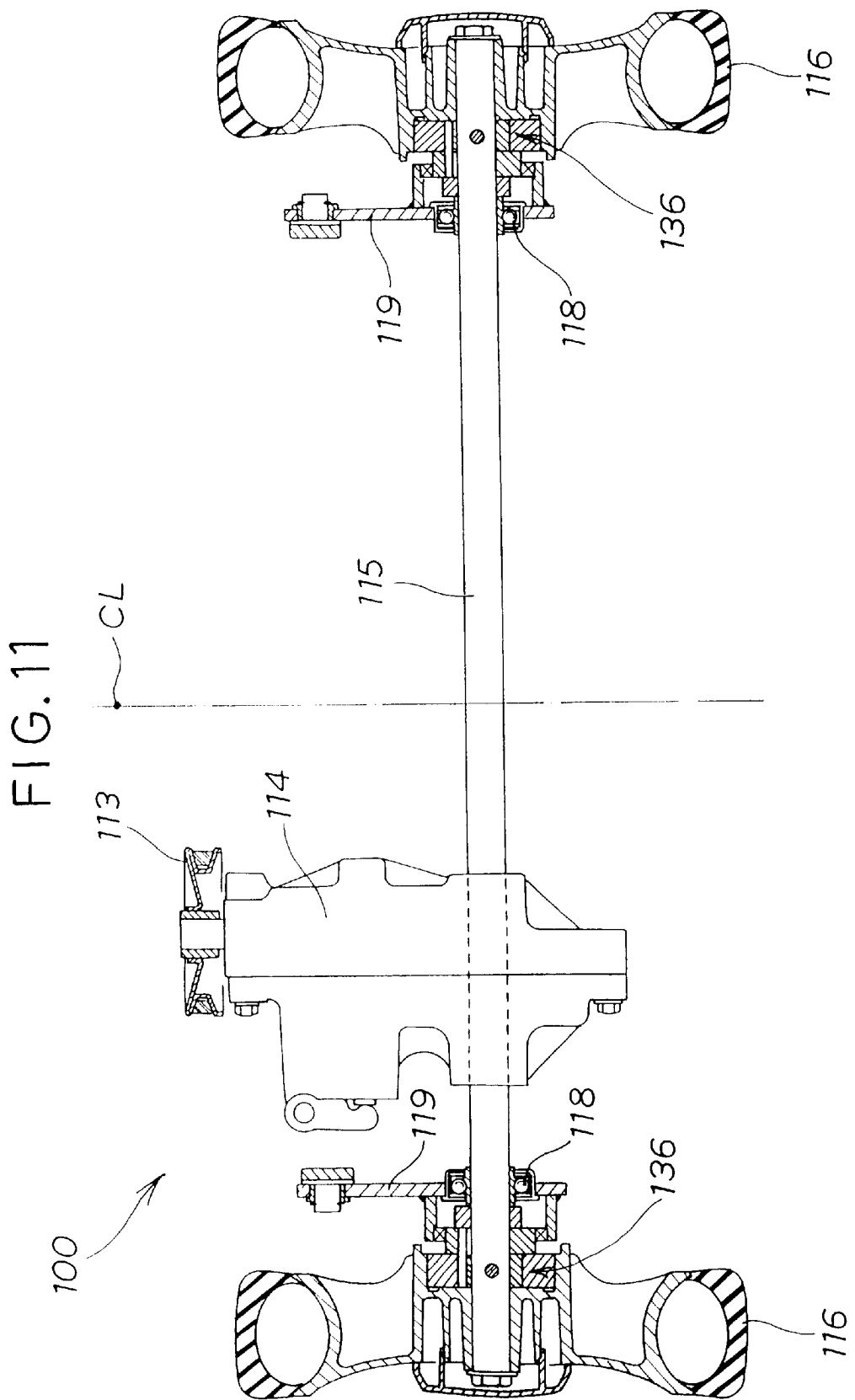
FIG. 11 is an enlarged sectional view on the line 11—11 in FIG. 10.

FIG. 11 shows the relationship between the transmission mechanism 114, the axle 115 and the rear wheels 116, 116.

In FIG. 11, the axle 115 is rotatably supported by left and right bearings 118, 118. The left and right rear wheels 116, 116 are connected to the ends of the axle 115 by way of clutch mechanisms 136, 136. The bearings 118, 118 are attached to the body frame 101 (see FIG. 10) by way of brackets 119, 119.

Figure 12:
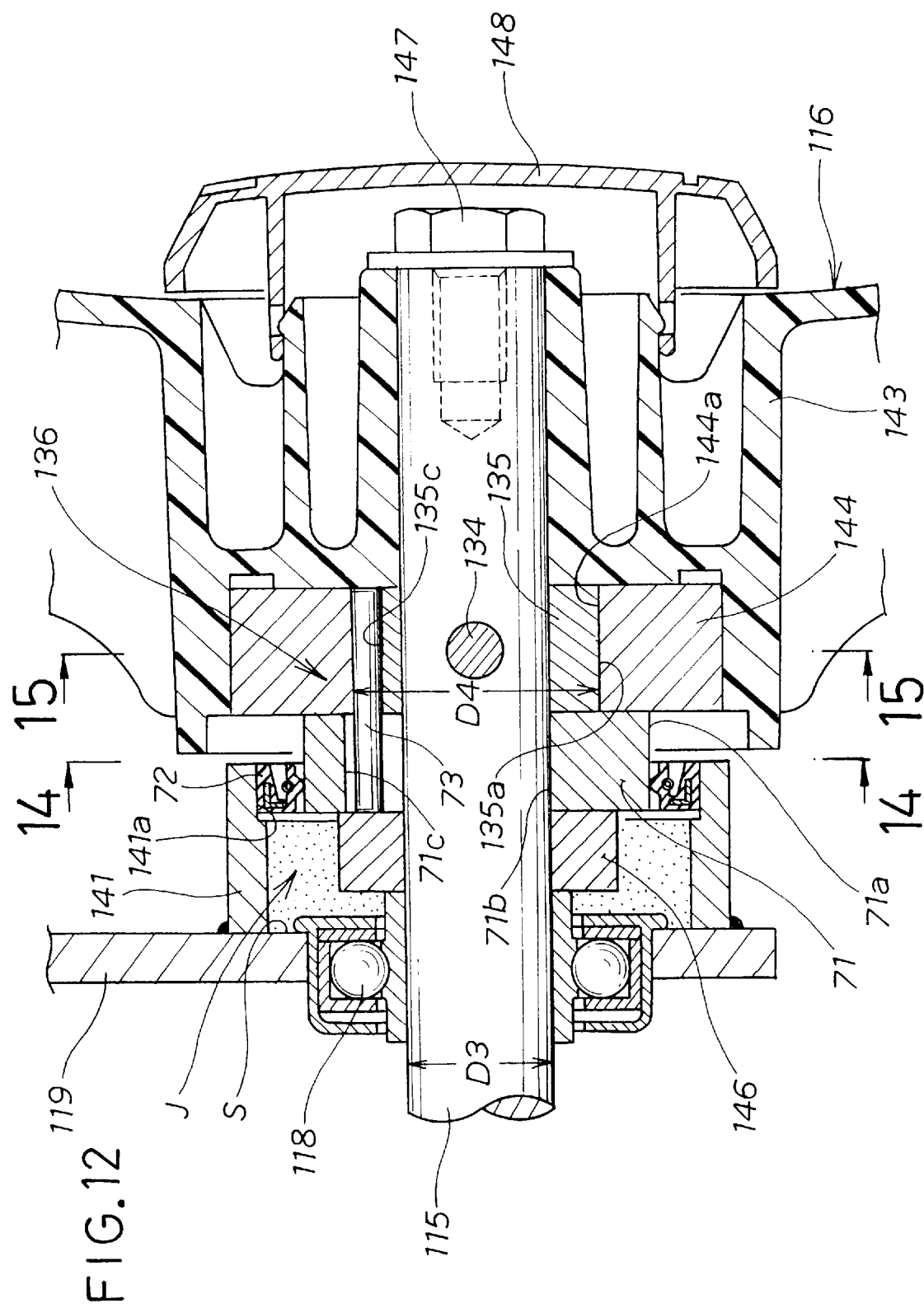
FIG. 12 is an enlarged sectional view showing details of the clutch mechanism shown in FIG. 11.

FIG. 12 shows details of one of the clutch mechanisms shown in FIG. 11. In this second preferred embodiment, a friction plate 71, an oil seal 72 and clutch pins 73 are the same as the corresponding members shown in the first preferred embodiment described above and have been given the same reference numerals.

The clutch mechanism 136 is a f fiction clutch which couples the axle 115, constituting a driving member, and the rear wheel 116, which is a driven member, only when the axle 115 rotates forward. This clutch mechanism 136 operates in the following ways (1) and (2):

(1) When the axle 115 rotates forward, the axle 115 and the rear wheel 116 are coupled and power is transmitted from the axle 115 to the rear wheel 116.

(2) When the axle 115 stops, the coupling of the axle 115 and the rear wheel 116 ends and the rear wheel 116 can rotate freely in both forward and reverse directions.

Specifically, as its basic construction, the clutch mechanism 136 has the axle 115, a cam member 135, the friction plate 71, the oil seal 72 and the clutch pins 73.

The cam member 135 is fitted on the axle 115 and fixed there by means of a pin 134. The rear wheel 116 is attached to the axle 115 by way of the cam member 135. The friction plate 71 is rotatably mounted on the axle 115. The oil seal 72 is interposed between the friction plate 71 and a housing 141 and applies a predetermined contact force to the outer circumferential surface of the friction plate 71. The clutch pins 73 engage with cam grooves 135c formed in the cam member 135, the inner circumferential surface 144a of a metal insert 144 fitted over the cam member 135, and pin-holding grooves 71c formed in the friction plate 71.

Figure 13:
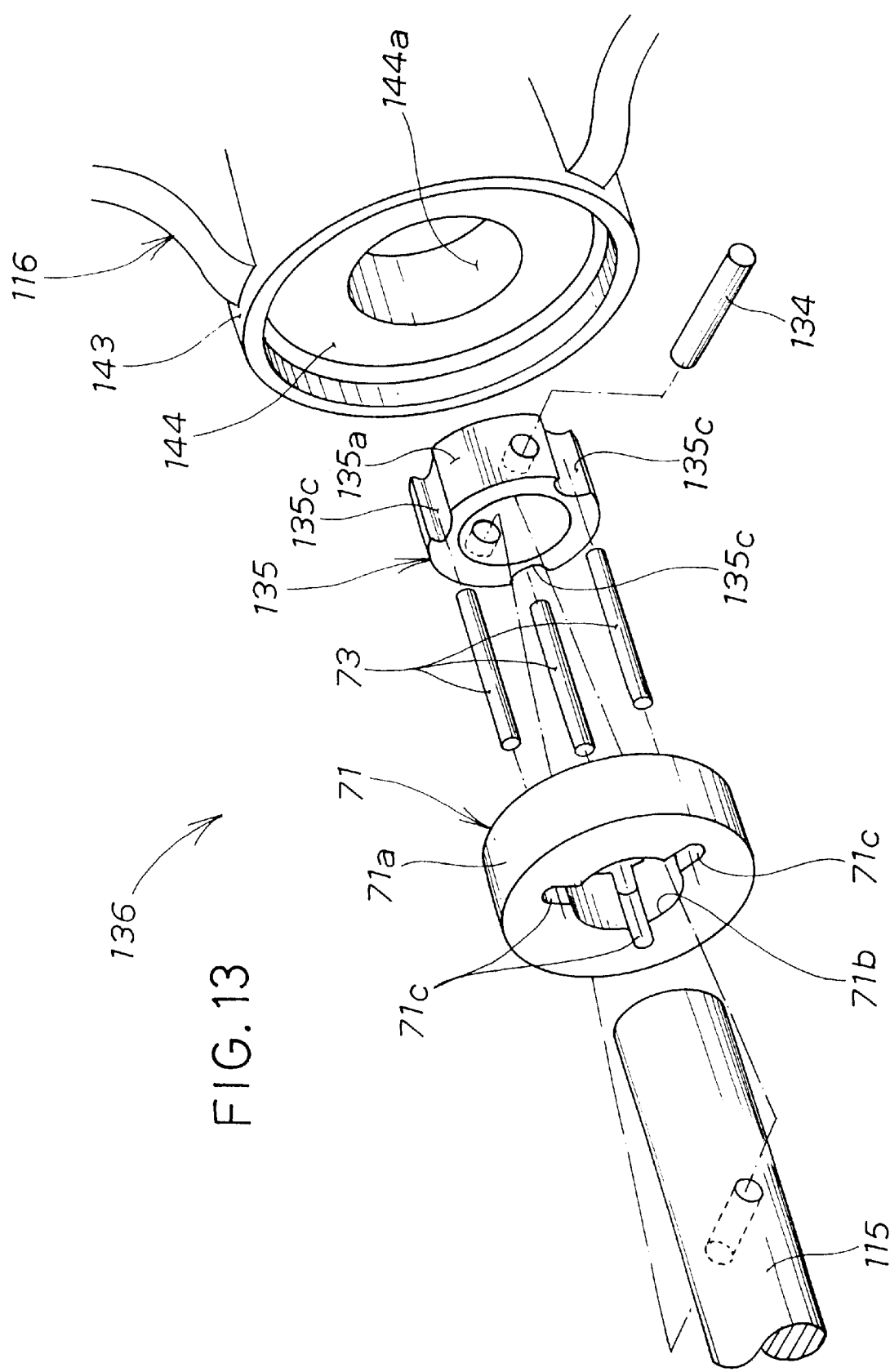
FIG. 13 is an exploded perspective view of the clutch mechanism shown in FIG. 12.

The axle 115 and the cam member 135 constitute a driving member. As shown in FIG. 13, three cam grooves 135c are formed extending in the axial direction with a uniform spacing in the circumferential direction in the outer circumferential surface of the driving member, which is the outer circumferential surface 135a of the cam member 135.

The rear wheel 116 has the reinforcing metal insert 144 in a hub 143 made of resin, and hereinafter any reference to the rear wheel 116 includes the hub 143 and the metal insert 144. The cam member 135 rotatably supports the metal insert 144. The metal insert 144 part may alternately be formed integrally with the hub 143.

The housing 141 for the seal is attached to a bracket 119. The oil seal 72 is fitted in an opening formed by an inner circumferential surface 141a of the housing 141. A space S enclosed by the housing 141, the friction plate 71 and the oil seal 72 is filled with a lubricant J, for example grease. In the figure, the reference numeral 146 denotes a thrust ring. The axle 115 has its end fixed by a bolt 147 to the hub 143 so that it cannot slip out from the rear wheel 116. This part where the axle 115 is attached to the hub 143 is covered by a cap 148.

Figure 14:
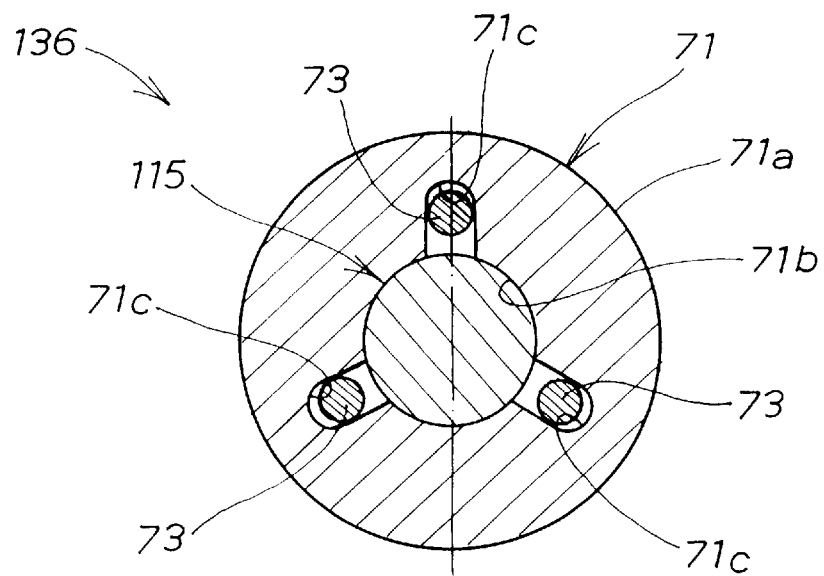
FIG. 14 is a sectional view on the line 14—14 in FIG. 12.

FIG. 14 shows the coupling relationship between the axle 115, the friction plate 71 and the clutch pins 73 of when the clutch mechanism 136 is OFF. The clutch pins 73 fit deep in the pin-holding grooves 71c formed in the friction plate 71 and are away from the outer circumferential surface of the axle 115 and do not make contact with it.

Figure 15:
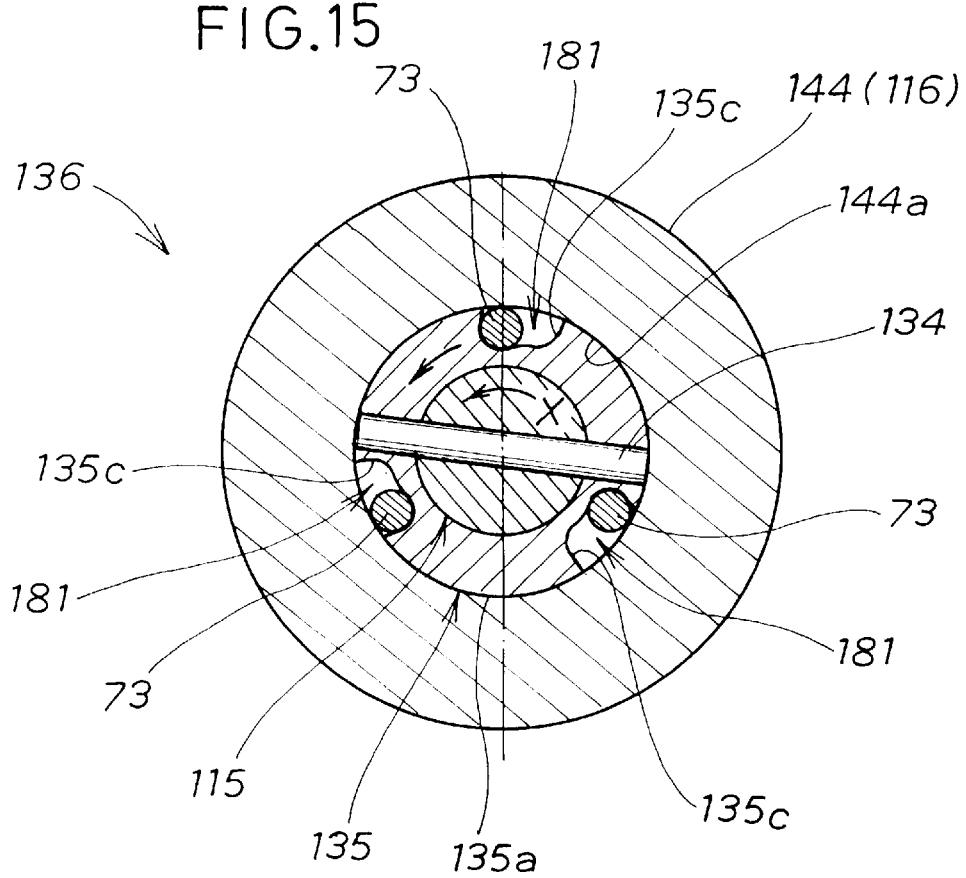
FIG. 15 is a sectional view on the line 15—15 in FIG. 12.

FIG. 15 shows the coupling relationship between the axle 115 including the cam member 135, the rear wheel 116 and the clutch pins 73 of when the clutch mechanism 136 is OFF. The three clutch pins 73 are severally received in the three cam grooves 135c formed with a uniform spacing in the outside of the cam member 135. The cam grooves 135c are of the same shape and the same dimensions as the cam grooves 35c shown in the first preferred embodiment. The bottom faces of the cam grooves 135c together with the inner circumferential surface 144a of the metal insert 144 form tapered space parts 181. The tapered space parts 181 are of the same shape and the same dimensions as the tapered spaces 81 shown in the first preferred embodiment.

The operation of the clutch mechanism 136 is the same as the operation of the clutch mechanism 36 shown in the first preferred embodiment. That is, when as shown in FIG. 15 the axle 115 rotates forward as shown by the arrow X when the clutch mechanism 136 is OFF, the cam member 135 also rotates in the same direction and the clutch becomes ON. Because a detailed description of the operation of the clutch mechanism 136 would be the same as the description in the first preferred embodiment, non e will be given here.

With this second preferred embodiment, because e the cam member 135 is provided on the axle 115, the diameter of the cam member 135 and the number of cam grooves 135c can be changed simply, without changing the dimensions and shape of the axle 115.

Returning to FIG. 11 to explain the operation of the lawnmower 100, the left rear wheel 116 and the right rear wheel 116 both have the same coupling structure and are coupled to the ends of the axle 115 by the clutch mechanisms 136, 136. Consequently, the left and right clutch mechanisms 136, 136 can be used as differential devices. For example, when while the lawnmower 100 is moving forward the lawnmower 100 is to be turned to the right, the lawnmower 100 is pushed by hand so that the rotation of the left rear wheel 116 becomes faster than the forward speed of the lawnmower 100. When this is done, the speed of rotation of the left rear wheel 116 becomes faster than the speed of rotation of the axle 115, and as a result the axle 115 assumes a state of reverse rotation with respect to the left rear wheel 116 and the clutch-ON state between the axle 115 and the rear wheel 116 ends. Accordingly, the left rear wheel 116 assumes an idling state with respect to the axle 115 and the lawnmower 100 can b e turned to the right.

Next, as a third preferred embodiment, a tilling machine having a clutch mechanism according to the invention will be described, on the basis of FIGS. 16 through 22C(b).

Figure 16:
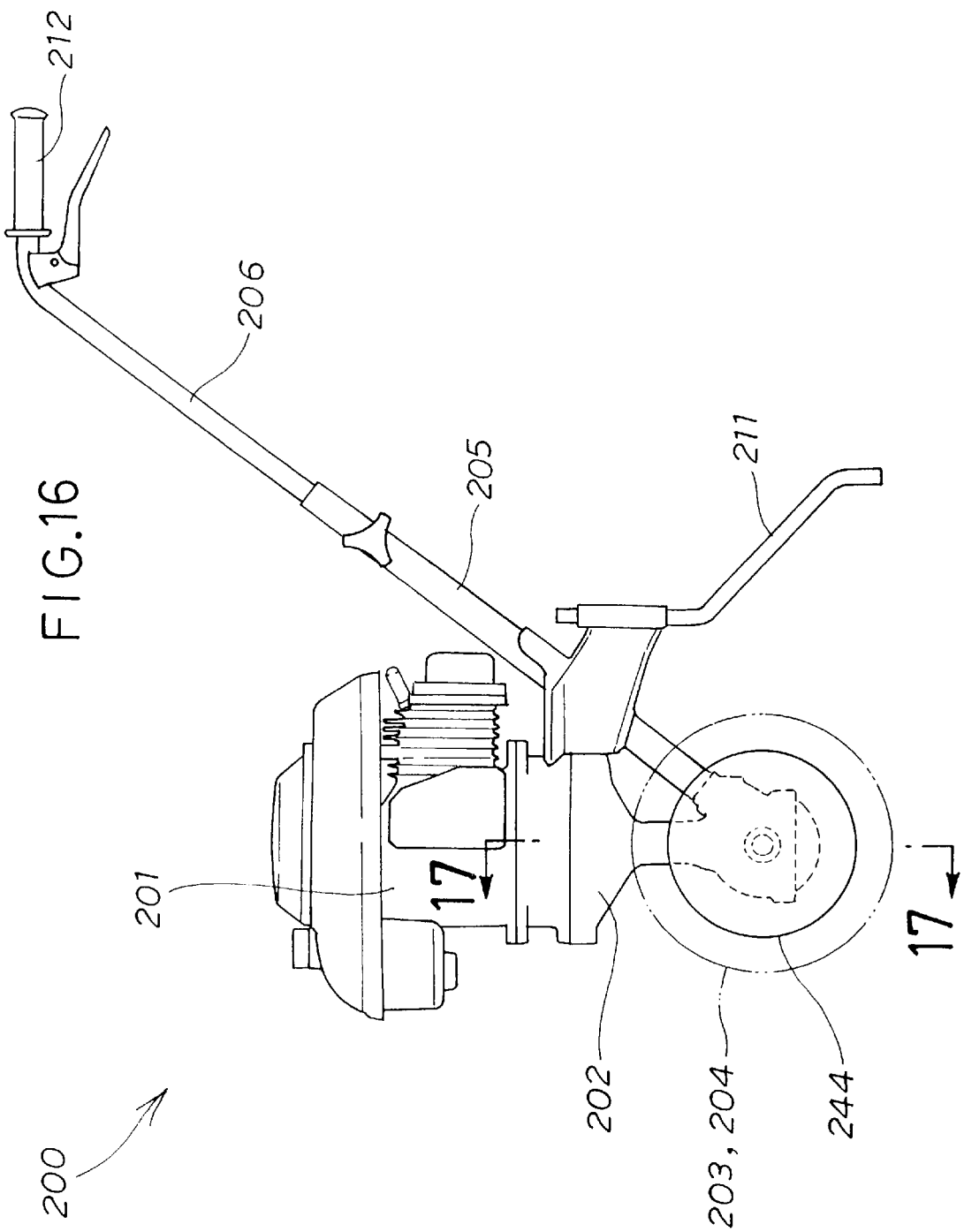
FIG. 16 is a side view of a tilling machine having a clutch mechanism according to a third preferred embodiment of the invention.

In FIG. 16, a tilling machine 200 is a walking-type self-propelled tilling machine made up of an engine 201, a speed-reducer 202 mounted below the engine, first tilling claws 203 and second tilling claws 204 coupled to the speed-reducer 202, a handle post 205 extending upward and rearward from the rear part of the speed-reducer 202, and an operating handle 206 attached to the upper part of the handle post 205. In the figure, the reference numeral 211 denotes a resistance bar and the reference numeral 212 denotes grips.

Figure 17:
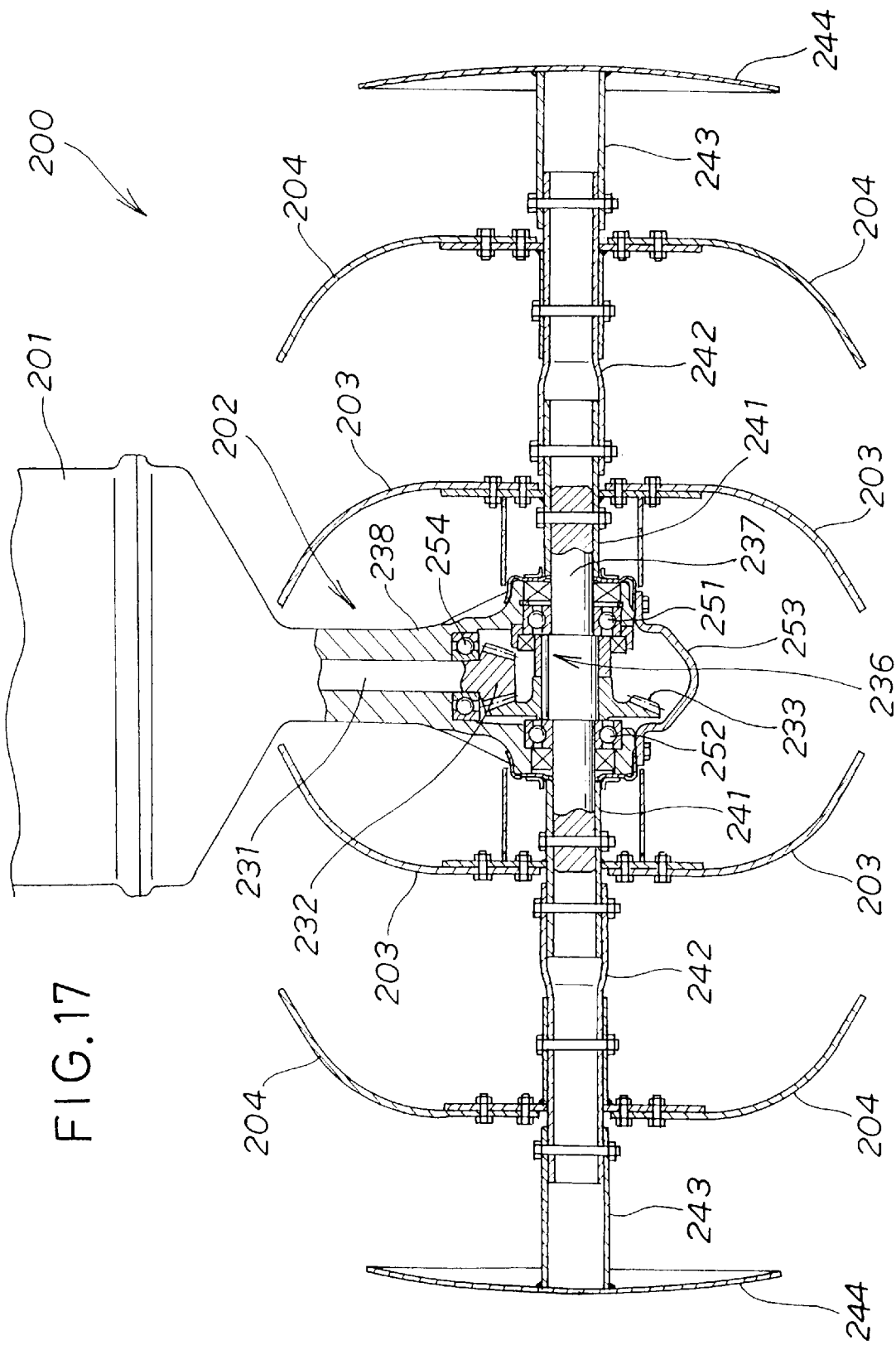
FIG. 17 is an enlarged sectional view on the line 17—17 in FIG. 16.

Referring to FIG. 17, The speed-reducer 202 is made up of a drive shaft 231 extending downward from the output side of the engine 201, a small bevel gear 232 formed on the lower end of the drive shaft 231, a large bevel gear 233 meshing with the small bevel gear 232, a driven shaft 237 coupled to the large bevel gear 233 by way of a clutch mechanism 236, and a housing 238 containing these members 231 through 237. The driven shaft 237 is a horizontal shaft extending in the width direction of the tilling machine. The housing 238 rotatably supports the driven shaft 237 by way of a first bearing 251 and a second bearing 252. A lower opening of the housing 238 is closed by a cover 253.

First tilling shafts 241, 241 are connected to the left and right ends of the driven shaft 237. Second tilling shafts 242, 242 are connected to the left and right ends of these first tilling shafts 241, 241. Third tilling shafts 243, 243 are connected to the left and right ends of the second tilling shafts 242, 242. The first tilling claws 203 are attached to the first tilling shafts 241. The second tilling claws 204 are attached to the second tilling shafts 242. Side discs 244 are attached to the third tilling shafts 243. The reference numeral 254 denotes a third bearing.

Figure 18:
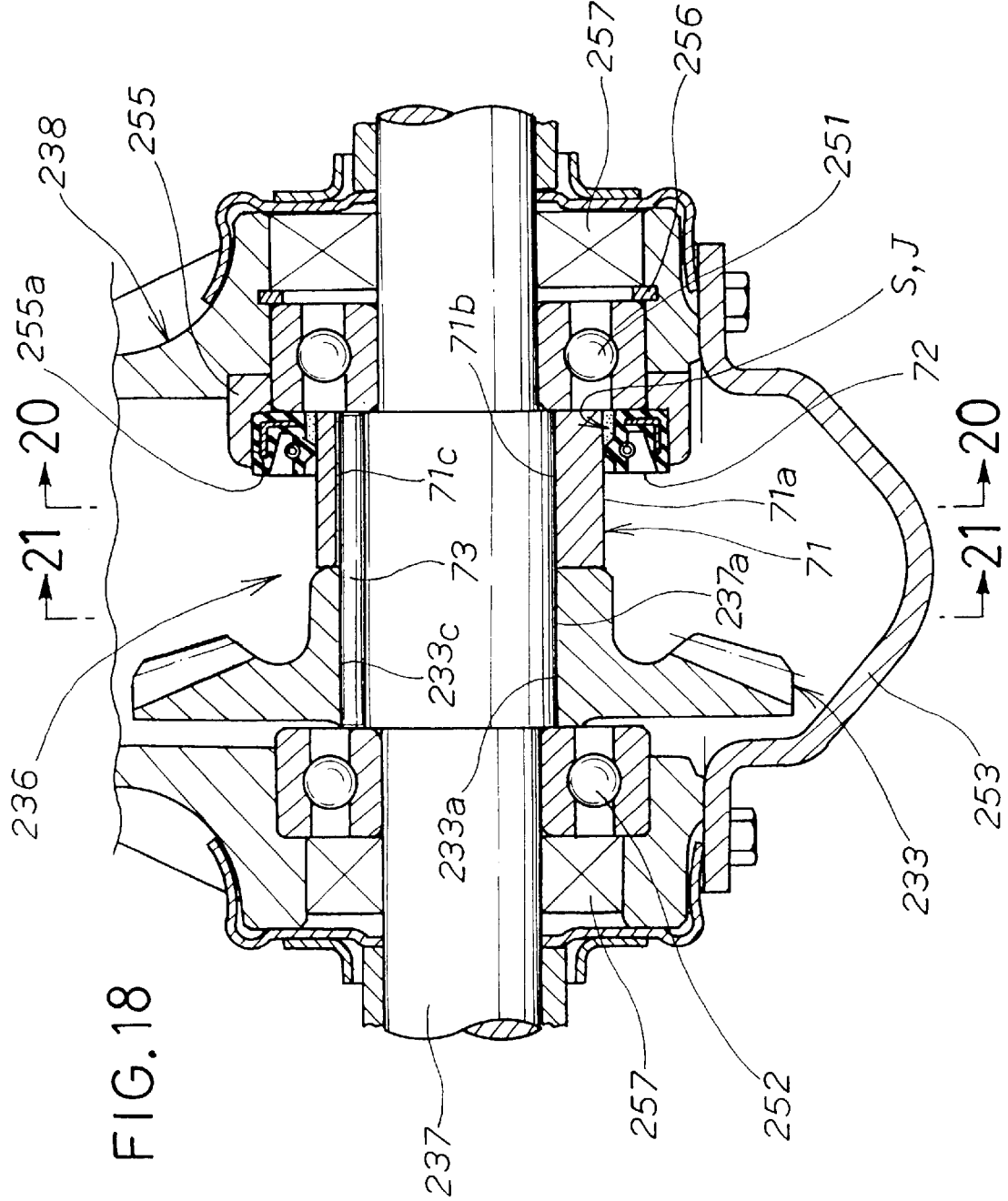
FIG. 18 is an enlarged sectional view showing in detail the clutch mechanism shown in FIG. 17.

FIG. 18 shows details of the clutch mechanism 236 shown in FIG. 17 in an enlarged sectional view.

In FIG. 18, the clutch mechanism 236 is a friction clutch which couples the large bevel gear 233, which is a driving member, and the driven shaft 237, which is a driven member, only when the large bevel gear 233 rotates forward. That is, the clutch mechanism 236 operates in the following ways (1) and (2):

(1) When the large bevel gear 233 rotates forward, the large bevel gear 233 is coupled with the driven shaft 237 and power is transmitted from the large bevel gear 233 to the driven shaft 237.

(2) When the large bevel gear 233 stops, the large bevel gear 233 and the driven shaft 237 are uncoupled and the driven shaft 237 can rotate in both forward and reverse directions.

Specifically, the clutch mechanism 236 has as its basic construction a combination of the driven shaft 237, the large bevel gear 233 and a friction plate 71 rotatably supported by the driven shaft 237, an oil seal 72 interposed between the friction plate 71 and a housing 238 for providing a predetermined force between the two, and clutch pins 73 for engaging with cam grooves 233c in the large bevel gear 233, the outer circumferential surface 237a of the driven shaft 237, and pin-holding grooves 71c in the friction plate 71.

The friction plate 71, the oil seal 72 and the clutch pins 73 are the same as the corresponding members shown in the first preferred embodiment described above and have been given the same reference numerals.

Figure 19:
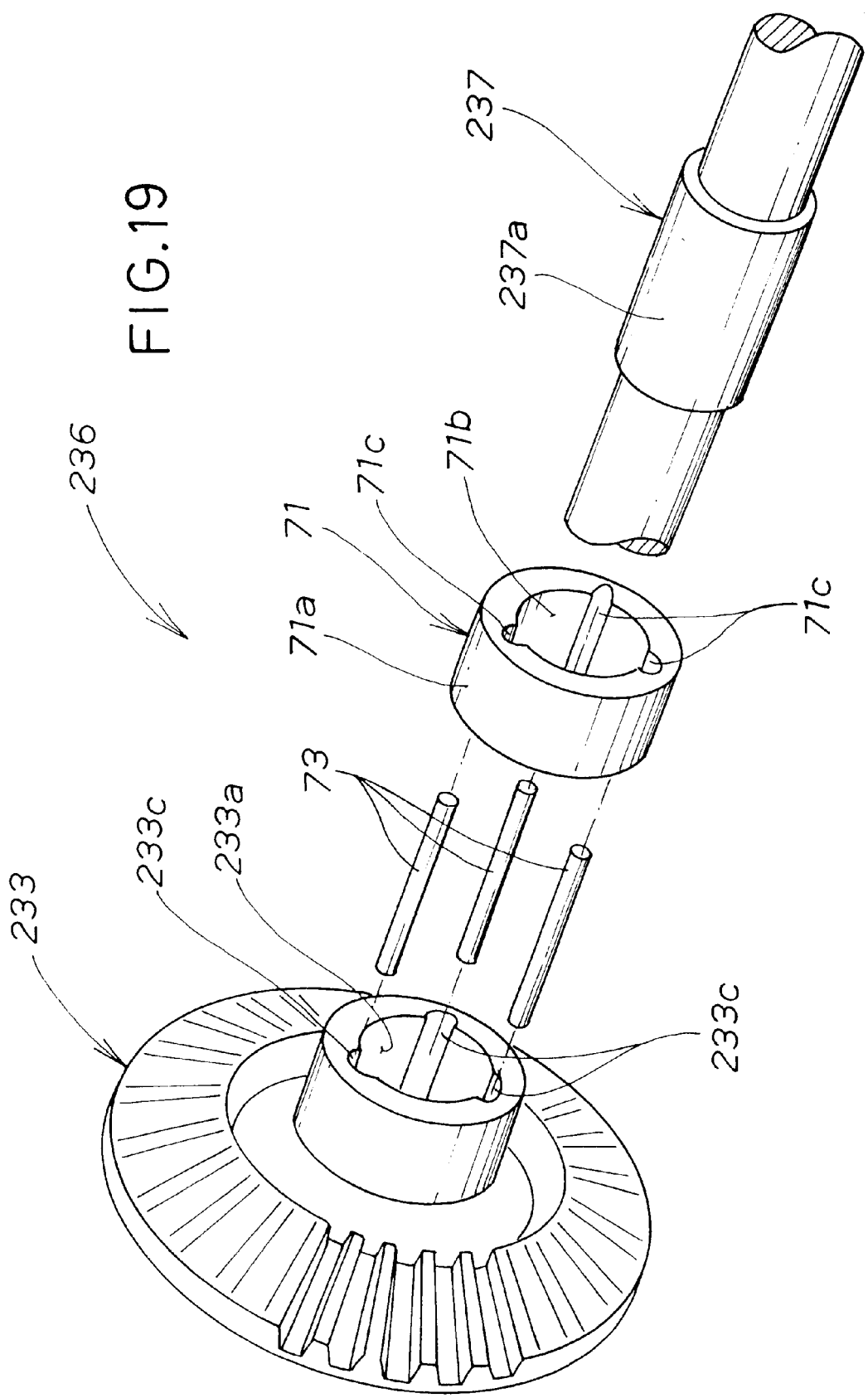
FIG. 19 is an exploded perspective view of the clutch mechanism shown in FIG. 18.

The large bevel gear 233 has three cam grooves 233c in an inner circumferential surface 233a thereof, as shown in FIG. 19. The driven shaft 237 is held immovably in the axial direction between the first and second bearings 251, 252 by steps formed by the diameter of a central section being made larger than the diameter of other sections. The friction plate 71 and the large bevel gear 233 are also immovable between the first and second bearings 251, 25.

The housing 238 has inside it a seal mounting part 255. The oil seal 72 is fitted around an inner circumferential surface 255a at an opening of this seal mounting part 255. A space S enclosed by the seal mounting part 255, which is a part of the housing, the friction plate 71 and the oil seal 72 is filled with a lubricant J, for example grease. The reference numeral 256 denotes a retaining ring for fixing the first bearing 251. The reference numeral 257 denotes oil seals.

Figure 20:
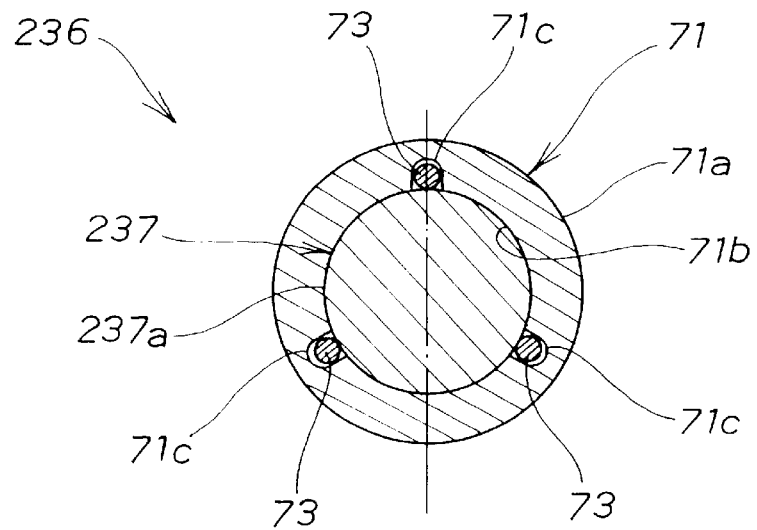
FIG. 20 is a sectional view on the line 20—20 in FIG. 18, and shows a coupling relationship between a friction plate, clutch pins and a driven shaft of when the clutch mechanism is OFF.

FIG. 20 shows the coupling relationship between the friction plate 71, the clutch pins 73 and the driven shaft 237 of when the clutch mechanism 236 is OFF.

Figure 21:
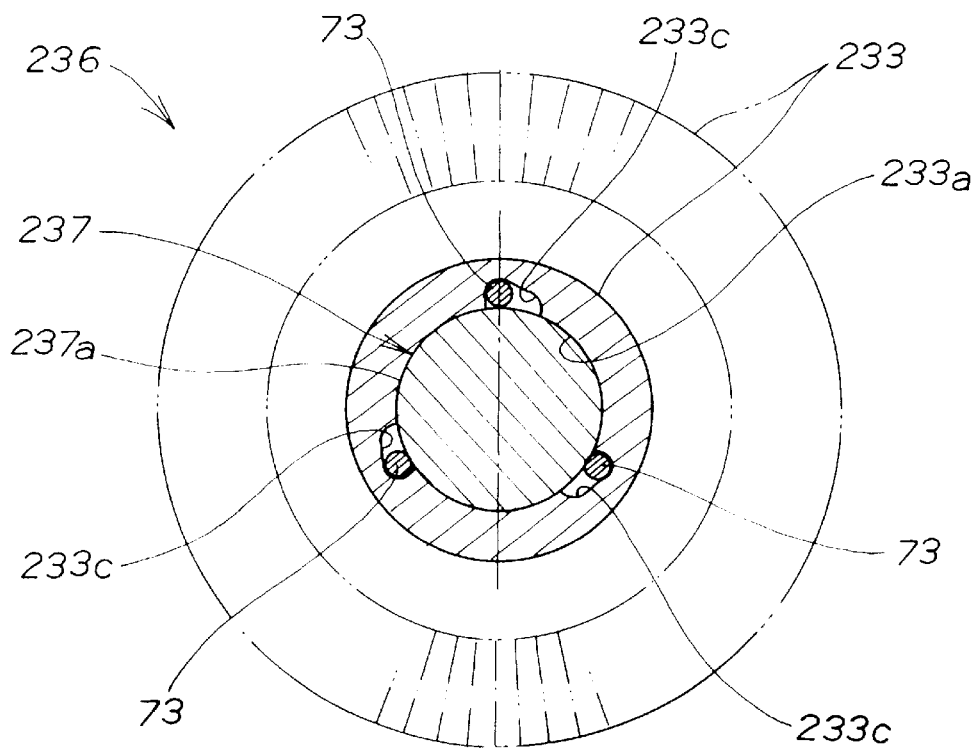
FIG. 21 is a sectional view on the line 21—21 in FIG. 18, and shows a coupling relationship between clutch pins, a large bevel gear and a driven shaft of when the clutch mechanism is OFF.

FIG. 21 shows the coupling relationship between the clutch pins 73, the large bevel gear 233 and the driven shaft 237 of when the clutch mechanism 236 is OFF. Three of the cam grooves 233c are formed with a uniform spacing in the large bevel gear 233. The clutch pins 73 are fitted in these cam grooves 233c.

Figure 22A:
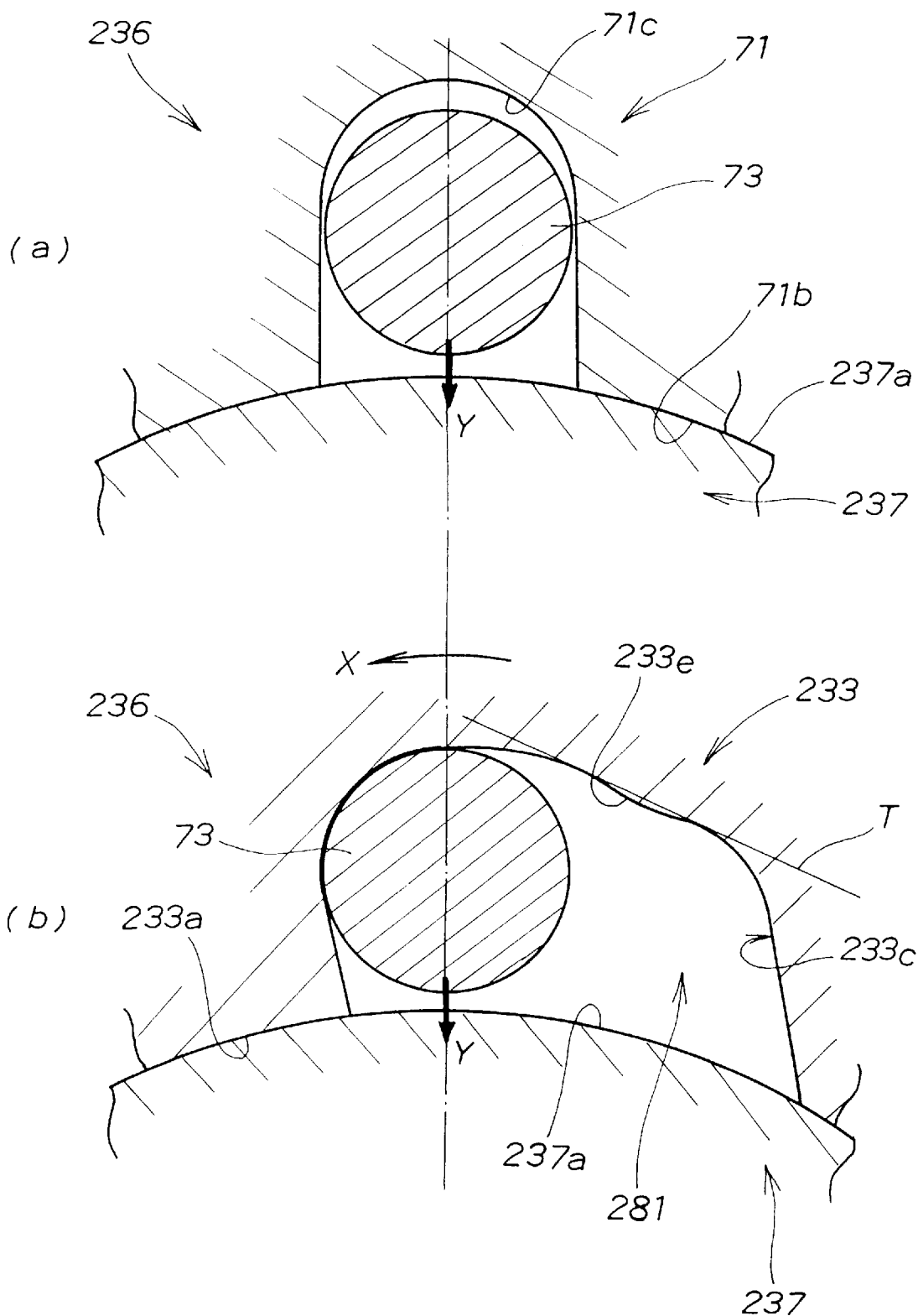
FIGS. 22A(a) through 22C(b) are views illustrating the operation of the clutch mechanism of the third preferred embodiment.

FIG. 22A(a) and 22A(b) are sectional views of the clutch mechanism in its OFF state.

FIG. 22A(a) shows enlarged the vicinity of a clutch pin 73 shown in FIG. 20.

Referring to FIG. 22A(b), the groove depth of the cam groove 233c is set to become gradually shallower with progress in the opposite direction from the forward direction of the large bevel gear 233 shown with an arrow X. Consequently, a tapered space part 281 is formed by the bottom face 233e of the cam groove 233c and the outer circumferential surface 237a of the driven shaft 237. The clutch pin 73 is disposed in this tapered space part 281. The tapered space part 281 is a tapered (wedge-shaped) space having a predetermined angle at which the extension line T of the approximately flat bottom face 233e and the arcuate outer circumferential surface 237a intersect. The bottom face 233e is formed with a gentle arcuate face swelling slightly toward the open side of the cam groove 233c (the side where the outer circumferential surface 237a of the driven shaft 237 is). This arcuate face is the same curved face as that of the first preferred embodiment shown in FIG. 7(b) and FIG. 8D.

Next, the operation of the clutch mechanism 236 of this third preferred embodiment will be described on the basis of FIGS. 22A(a) through 22C(b).

As shown in FIG. 22A(a), when the clutch mechanism 236 is OFF, the clutch pins 73 are movable in the radial direction Y between the bottom face 233e and the outer circumferential surface 237a.

Figure 22B:
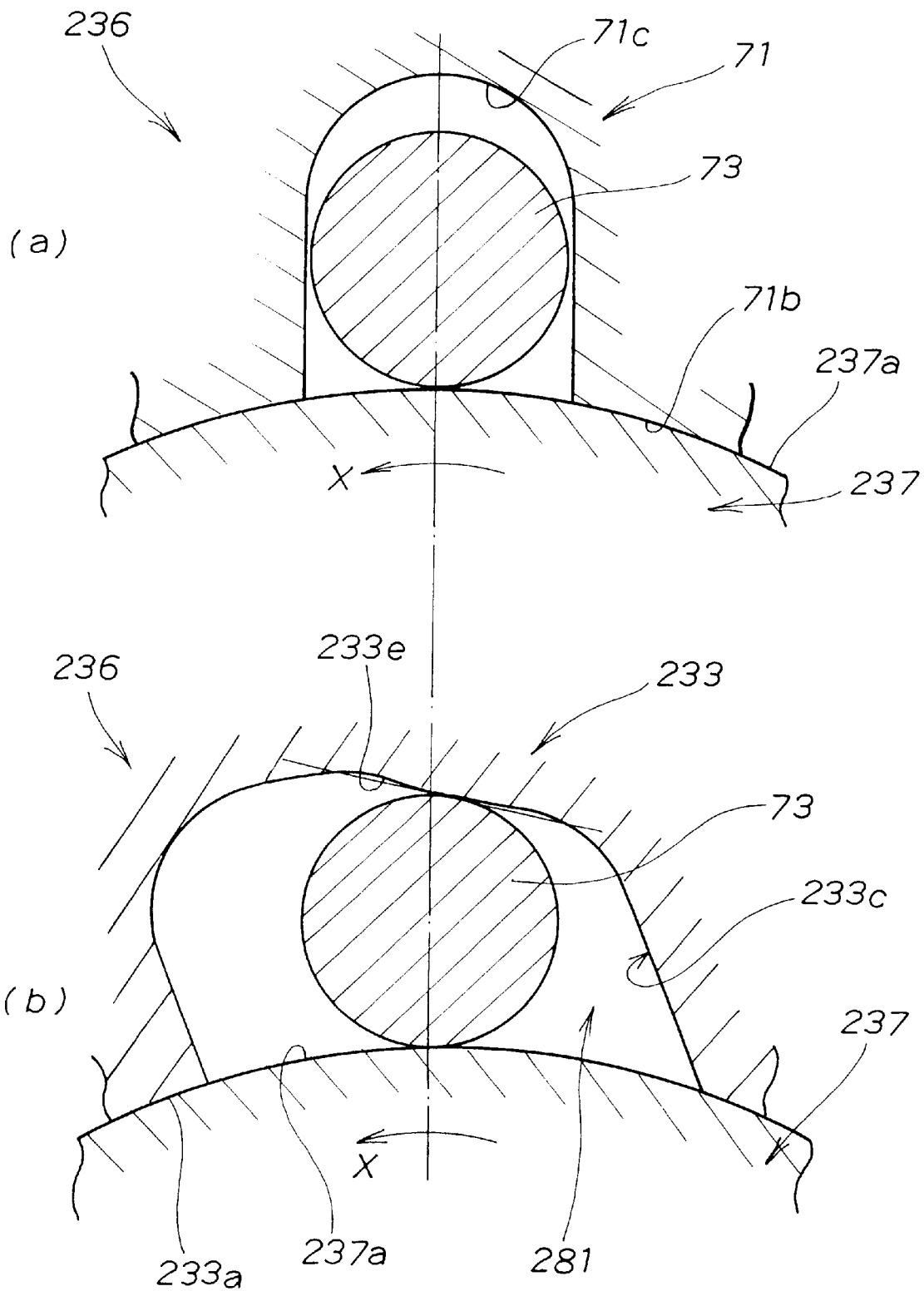

With the friction plate 71 stopped, even when the large bevel gear 233 is rotated, because the clutch pin 73 is engaged with the pin-holding groove 71c of the friction plate 71, it does not immediately move in the rotation direction of the large bevel gear 233. When the large bevel gear 233 is forward-rotated in the arrow X direction, the bottom face 233e presses the clutch pin 73 against the outer circumferential surface 237a of the driven shaft 237. That is, as shown in FIG. 22B(b), a wedge action causes the clutch pin 73 to engage with the frictional engagement faces forming the tapered space part 281, whereby the clutch mechanism 236 becomes ON and power is transmitted from the large bevel gear 233 to the driven shaft 237. Here, the frictional engagement faces of the tapered space part 281 are the bottom face 233e and the outer circumferential surface 237a. When the clutch mechanism 236 becomes ON, the driven shaft 237 rotates in the same direction as the large bevel gear 233. The friction plate 71 rotates in the arrow X direction after a slight delay from the start of the rotation of the driven shaft 237.

When with the clutch mechanism 236 ON the rotation of the large bevel gear 233 stops and the driven shaft 237 is caused to move in the arrow X direction, the coupling of the large bevel gear 233 and the driven shaft 237 effected by the clutch pins 73 ends and the mechanism reverts to the OFF state. The driven shaft 237 then rotates freely.

Figure 22C:
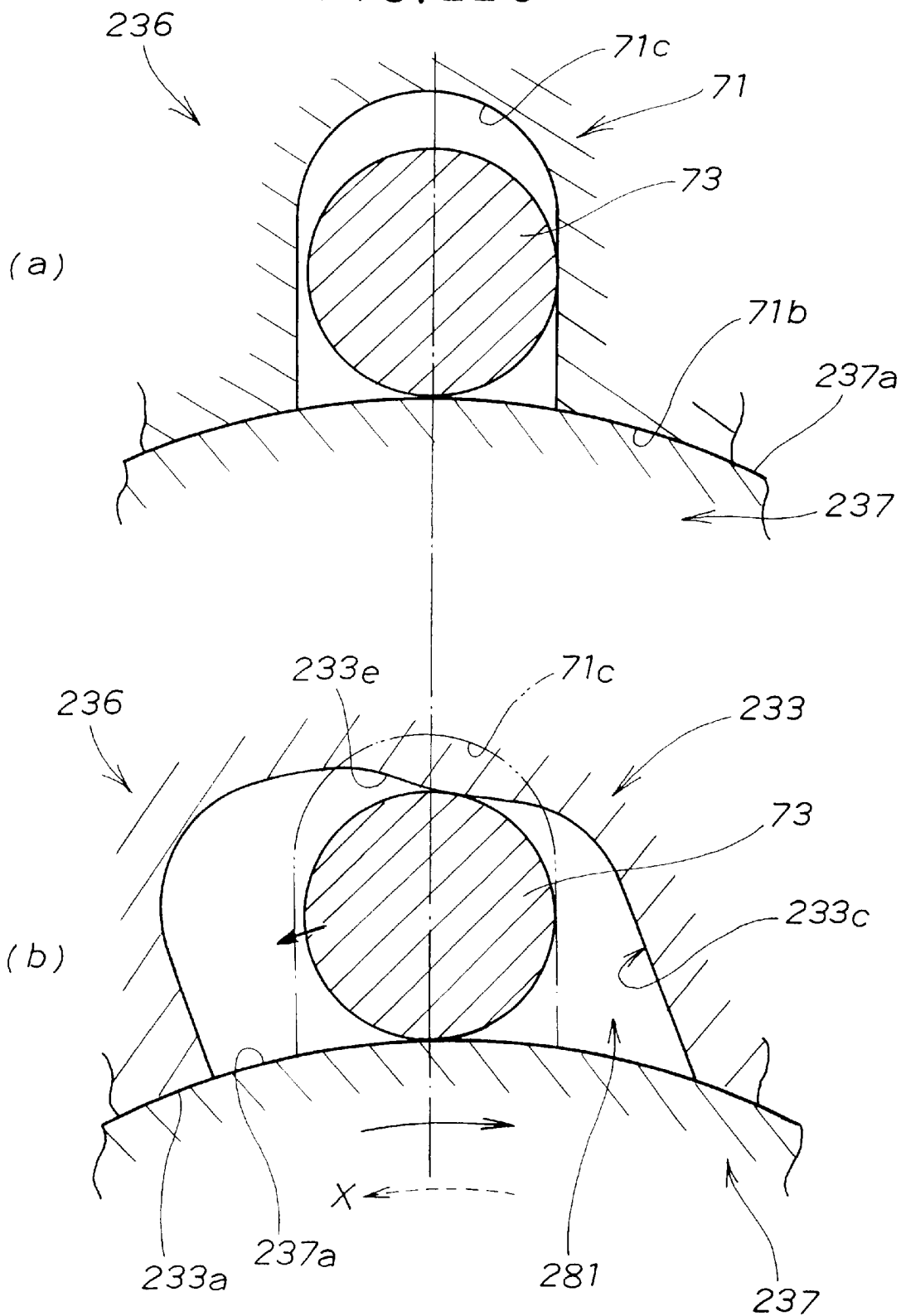

Referring to FIGS. 22C(a) and 22C(b), when with the clutch mechanism 236 ON the large bevel gear 233 stops and the driven shaft 237 is caused to reverse-rotate in the opposite direction from the arrow X direction, the clutch pins 73 also reverse-rotate and abut with the wall faces of the pin-holding grooves 71c, as shown in FIG. 22C(a).

When the friction plate 71 is stopped, even when the driven shaft 237 is rotated, the clutch pins 73 cannot move in this direction. When with the clutch pins 73 abutting upon the wall faces of the pin-holding grooves 71c the driven shaft 237 is reverse-rotated further, the wedge action on the clutch pins 73 ceases. Consequently, the coupling of the large bevel gear 233 and the driven shaft 237 ends and the clutch mechanism 236 becomes OFF. The driven shaft 237 then rotates freely.

In the preferred embodiments described above: (1) The clutch mechanisms 36, 136, 236 can be applied to various devices other than the electric power-assisted mono-wheeled barrow 10, the lawnmower 100 and the tilling machine 200, such as a grass-cutting machines, dollies, machine tools, automotive vehicles and manual machines. (2) The drive source for driving the driving member of the clutch mechanism 36, 136, 236 may be any of various drive sources, including electric motors, hydraulic motors, and engines. (3) The driving member and the driven member in the clutch mechanisms 36, 136, 236 may be any of various power transmission members, including shafts and gears. (4) The number of pin-holding grooves 71c, clutch pins 73 and cam grooves 35c, 135c, 233c in the clutch mechanism 36, 136, 236 can be set in correspondence with the torque to be transmitted through the mechanism, and the rigidity of related parts can also be set as appropriate. (5) The oil seal 72 can be any which when having its lip 72b fitted around the outer circumferential face 71a of the friction plate 71 can produce a stable predetermined frictional force at all times between the outer circumferential face 71a and the lip 72b, even when the friction plate 71 rotates at high speed, and can provide a seal allowing the space S to be filled with the lubricant J. For example, it may be any of various oil seals specified in JIS B-2402.

What is claimed is:

1. A clutch mechanism, comprising:

a housing;

a driving member, rotatably supported by the housing and having a plurality of cam grooves formed in an outer circumferential face thereof and extending in an axial direction thereof;

a driven member, which can rotate coupled to the driving member and rotate freely, uncoupled from the driving member;

a disc-shaped friction plate, rotatably supported by the driving member and having in an inner circumferential face thereof a plurality of pin-holding grooves, facing the cam grooves and having their depths in a radial direction;

tapered space parts, each formed by frictional engagement faces consisting of a bottom face of a cam groove and an inner circumferential face of the driven member;

a plurality of clutch pins, each disposed partly in a tapered space part and partly between the cam groove forming that tapered space part and the pin-holding groove facing that cam groove;

an oil seal, interposed between an inner circumferential surface of the housing and an outer circumferential surface of the friction plate, for providing an action force tending to prevent the clutch pins from moving; and a lubricant, filling a space enclosed by the housing, the friction plate and the oil seal, wherein when the driving member rotates, utilizing a frictional force on the friction plate, the clutch pins are engaged with the frictional engagement faces of the tapered space parts by a wedge action and the driving member and the driven member are coupled so that power can be transmitted from the driving member to the driven member, and when the driving member stops, the driving member and the driven member cease to be coupled by the clutch pins and the driven member assumes an idling state with respect to the driving member.

2. A clutch mechanism according to claim 1, wherein the bottom face of each of the cam grooves has an arcuate face swelling toward the opening of the cam groove.

3. A clutch mechanism, comprising:

a housing;

a driven member, rotatably supported by the housing;

a driving member, which can rotate coupled to the driven member and rotate freely, uncoupled from the driving member, having a plurality of cam grooves formed in an inner circumferential face thereof and extending in an axial direction thereof;

a disc-shaped friction plate, rotatably supported by the driven member and having in an inner circumferential face thereof a plurality of pin-holding grooves, facing the cam grooves and having their depths in a radial direction;

tapered space parts, each formed by frictional engagement faces consisting of a bottom face of a cam groove and an outer circumferential face of the driven member;

a plurality of clutch pins, each disposed partly in a tapered space part and partly between the cam groove forming that tapered space part and the pin-holding groove facing that cam groove;

an oil seal, interposed between an inner circumferential surface of the housing and an outer circumferential surface of the friction plate, for providing an action force tending to prevent the clutch pins from moving; and a lubricant, filling a space enclosed by the housing, the friction plate and the oil seal, wherein when the driving member rotates, utilizing a frictional force on the friction plate, the clutch pins are engaged with the frictional engagement faces of the tapered space parts by a wedge action and the driving member and the driven member are coupled so that power can be transmitted from the driving member to the driven member, and when the driving member stops, the driving member and the driven member cease to be coupled by the clutch pins and the driven member assumes an idling state with respect to the driving member.

4. A clutch mechanism according to claim 3, wherein the bottom face of each of the cam grooves has an arcuate face swelling toward the opening of the cam groove.

* * * * *